(12) United States Patent
Kato et al.

(10) Patent No.: US 10,168,651 B2
(45) Date of Patent: Jan. 1, 2019

(54) IMAGE FORMING APPARATUS WHICH SUPPLIES HEATER CURRENT ACCORDING TO PULSE MODULATION OR PHASE CONTROL DEPENDING ON POWER CONSUMPTION

(71) Applicant: Konica Minolta, Inc., Chiyoda-ku, Tokyo (JP)

(72) Inventors: Shigetaka Kato, Shinshiro (JP); Seiichi Kirikubo, Toyohashi (JP); Yutaka Yamamoto, Shinshiro (JP); Naoto Sugaya, Toyokawa (JP); Nobuhiro Matsuo, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/914,277

(22) Filed: Mar. 7, 2018

(65) Prior Publication Data

US 2018/0267447 A1 Sep. 20, 2018

(30) Foreign Application Priority Data

Mar. 15, 2017 (JP) .................................. 2017-049998

(51) Int. Cl.
*G03G 15/00* (2006.01)
*G06K 15/00* (2006.01)
*G03G 15/20* (2006.01)

(52) U.S. Cl.
CPC ..... *G03G 15/2039* (2013.01); *G03G 15/5004* (2013.01); *G06K 15/4055* (2013.01)

(58) Field of Classification Search
CPC ............... G03G 15/2039; G03G 15/80; G03G 15/5004; G06K 15/4055
(Continued)

(56) References Cited

U.S. PATENT DOCUMENTS

2009/0245847 A1* 10/2009 Yuda .................. G03G 15/5004
399/88
2011/0217062 A1* 9/2011 Chosokabe ............ G03G 15/80
399/69
(Continued)

FOREIGN PATENT DOCUMENTS

JP 10-063352 A 3/1998
JP 10063352 A * 3/1998
(Continued)

*Primary Examiner* — Robert Beatty
(74) *Attorney, Agent, or Firm* — Buchanan Ingersoll & Rooney PC

(57) ABSTRACT

An image forming apparatus: acquires, before start of current supply to electric elements including heater, information indicating rated power of the heater and total consumption power of the electric elements excluding the heater; subtracts the total consumption power from upper power limit of the apparatus, and calculates maximum power not exceeding the rated power and remaining power thus subtracted; obtains duty ratio based on assumption of current supply corresponding to the maximum power according to pulse modulation, and determines whether the duty ratio falls within predetermined range; and controls, when the duty ratio falls within the range, drive circuit to supply alternating current by pulse modulation method, and when the duty ratio falls outside the range, to supply the alternating current by phase control method that temporarily interrupts the supply of the alternating current to the heater in half cycles of the alternating current.

20 Claims, 19 Drawing Sheets

(58) Field of Classification Search
USPC .................................... 399/67, 88; 219/216
See application file for complete search history.

(56) References Cited

U.S. PATENT DOCUMENTS

| | | | |
|---|---|---|---|
| 2014/0003830 A1* | 1/2014 | Higashi | G03G 15/5004 |
| | | | 399/69 |
| 2016/0124356 A1 | 5/2016 | Tamada et al. | |
| 2017/0082959 A1* | 3/2017 | Sasaki | G03G 15/80 |

FOREIGN PATENT DOCUMENTS

| | | | |
|---|---|---|---|
| JP | 2012173364 A | * | 9/2012 |
| JP | 2016-092887 A | | 5/2016 |
| JP | 2017078824 A | * | 4/2017 |

* cited by examiner

FIG. 3

Consumption power table  ⟵ 201

| Consumption power information |||| |
|---|---|---|---|---|
| Electric member name | ID | Mode | Consumption power (W) | |
| Main body (excluding fusing heater) | 001 | WU | 200 | ⎫ |
| | | PR | 400 | ⎬ 202 |
| | | WT | 100 | ⎭ |
| Fusing heater | 002 | WU | 1300 | ⎫ |
| | | PR | 1300 | ⎬ 203 |
| | | WT | 390 | ⎭ |
| Optional apparatus 1 | 003 | WU | 40 | ⎫ |
| | | PR | 100 | ⎬ 204 |
| | | WT | 20 | ⎭ |
| Optional apparatus 2 | 004 | WU | 40 | ⎫ |
| | | PR | 50 | ⎬ 205 |
| | | WT | 0 | ⎭ |
| Optional apparatus 3 | 005 | WU | 20 | ⎫ |
| | | PR | 50 | ⎬ 206 |
| | | WT | 0 | ⎭ |

Electric member list
(for warm-up mode)

| 001 | (Main body) |
| 002 | (Fusing heater) |

221

Electric member list
(for warm-up mode)

| 001 | (Main body) |
| 002 | (Fusing heater) |
| 003 | (Optional apparatus 1) |
| 004 | (Optional apparatus 2) |

222

Electric member list
(for warm-up mode)

| 001 | (Main body) |
| 002 | (Fusing heater) |
| 003 | (Optional apparatus 1) |
| 004 | (Optional apparatus 2) |

Electric member list
(for print mode)

231

| 001 | (Main body) |
| 002 | (Fusing heater) |
| 003 | (Optional apparatus 1) |

FIG. 5B

Electric member list
(for print mode)

232

| 001 | (Main body) |
| 002 | (Fusing heater) |
| 003 | (Optional apparatus 1) |
| 004 | (Optional apparatus 2) |

FIG. 5C

Electric member list
(for print mode)

233

| 001 | (Main body) |
| 002 | (Fusing heater) |
| 003 | (Optional apparatus 1) |
| 005 | (Optional apparatus 3) |

FIG. 6

Electric member list
(for power saving mode)

241

| 001 | (Main body) |
| 002 | (Fusing heater) |
| 003 | (Optional apparatus 1) |

FIG. 7

ON_DUTY correspondence table 251

| Consumption power of fusing heater(W) | ON_DUTY (%) |
|---|---|
| 1300 | 100 |
| 1250 | 96 |
| 1200 | 93 |
| 1150 | 88 |
| 1100 | 84 |
| 1050 | 80 |
| 1000 | 77 |
| 950 | 73 |
| 910 | 70 |
| 900 | 69 |
| 850 | 65 |
| 800 | 61 |
| ⋮ | ⋮ |
| 390 | 30 |

FIG. 10
Voltage
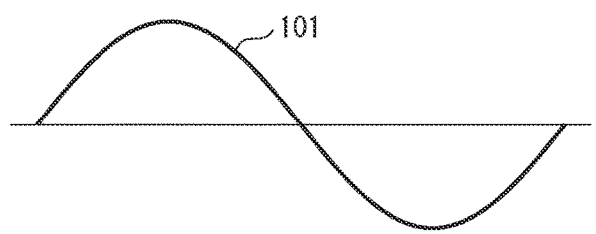
Current
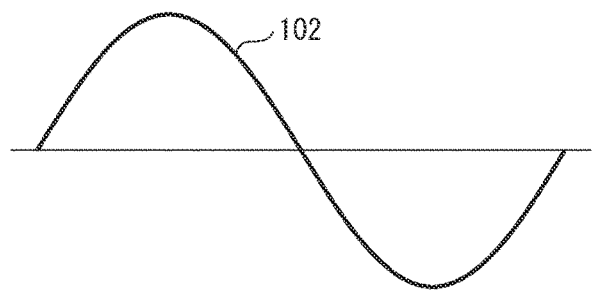
Driving current of fusing heater
First control signal
Driving current of fusing heater
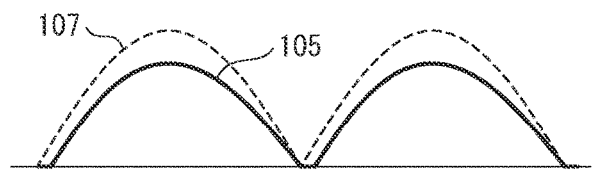
Second control signal
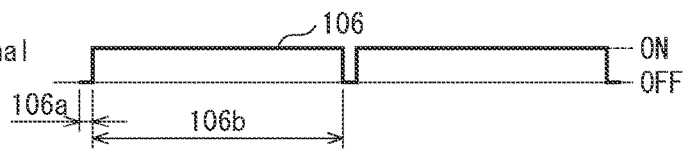

IMAGE FORMING APPARATUS WHICH SUPPLIES HEATER CURRENT ACCORDING TO PULSE MODULATION OR PHASE CONTROL DEPENDING ON POWER CONSUMPTION

This application claims priority to Japanese Patent Application No. 2017-049998 filed Mar. 15, 2017, the contents of which are hereby incorporated herein by reference in their entirety.

BACKGROUND

Technical Field

The present invention relates to an art of controlling current supply to a fusing heater included in a fusing unit of an image forming apparatus.

Description of the Related Art

In Japan, electric apparatuses need to operate at 15 ampere (A), which is an upper current limit supplied from a single electrical outlet, or lower (at an upper power limit of 1500 watt (W) or lower). Due to this, image forming apparatuses control current supply to an image reader unit, a printer unit, a post-processing apparatus, and so on in order to operate at the upper current limit or lower.

Also, image forming apparatuses fuse and press a toner image onto a recording sheet with a fusing unit including a fusing heater. According to Japanese Patent Application Publication No. 2016-92887, pulse width modulation (PWM) method is performed to generate a control signal that repeatedly turns on and off at a predetermined duty ratio and at a predetermined switching frequency, and this control signal is used to switch an input current by a switching element to supply a driving current to a fusing heater. At this time, a duty ratio of the control signal is set to a predetermined threshold value, for example to 70%, or lower, in order to prevent during the decrease of the driving current flowing through the fusing heater to zero due to switch-off, start of supply of the driving current in a next cycle. This is because setting the duty ratio to higher than 70% does not decrease the driving current to zero when the cycle switches, and this generates a recovery current flowing through a freewheel diode included in a chopper circuit and thus results in noise generation.

Assume the case for example as illustrated in portion (a) of FIG. 20 where an upper power limit consumable by the whole image forming apparatus is 1500 W, a consumption power of the whole image forming apparatus excluding a fusing heater (hereinafter, referred to as a main body) is 200 W, and a consumption power of the fusing heater is 1300 W that is a rated power thereof. In this case, a total consumption power of the whole image forming apparatus is 1500 W that does not exceed the upper power limit, and this raises no problem.

Here, consider the case for example where a sheet feeding apparatus, a post-processing apparatus, or the like is added as an optional apparatus to the image forming apparatus. In this case as illustrated in portion (b) of FIG. 20, as a result of an increase by 100 W that is a consumption power of the optional apparatus, the total consumption power, which is the sum of 200 W of the main body, 1300 W of the fusing heater, and 100 W of the optional apparatus, exceeds the upper power limit.

In response to this case, power to be supplied to the fusing heater only needs to be decreased. However, a duty ratio needs to be limited to 70% or lower. This is because according to the PWM method, settings of the duty ratio to higher than 70% as described above might cause noise generation. In the light of this, as illustrated in portion (c) of FIG. 20, the duty ratio is set to for example 70% or lower to avoid noise generation, and current is supplied to the fusing heater by the PWM method. At this time, a consumption power of the fusing heater is 910 W. Accordingly, the total consumption power, which is the sum of 200 W of the main body and 100 W of the optional apparatus, is 1210 W, and thus does not exceed the upper power limit.

In this case, 290 W out of the upper power limit of 1500 W (290 W=1500 W−1210 W) is not consumed. This raises a problem of the increase of warm-up time period of the fusing heater compared with the case where the unconsumed power of 290 W is maximally used as the consumption power of the fusing heater.

SUMMARY

The present invention aims to provide an image forming apparatus that solves the above problem to suppress extension of warm-up time period of a fusing unit by allocating to the fusing heater a highest possible power that does not exceed a rated power of the fusing heater even in the case where a consumption power varies for example due to addition of an optional apparatus.

To achieve the above aim, an image forming apparatus reflecting one aspect of the present invention is an image forming apparatus including: a plurality of devices that perform a series of electrostatic copying processes and each have one or more electric elements, wherein one of the devices has a heater as an electric element and fuses a toner image onto a sheet with a fusing member heated by the heater, and another of the devices is a drive circuit that controls supply of an alternating current from an alternating-current power source to the heater by switching between a pulse modulation method and a phase control method, the pulse modulation method using a duty ratio within a predetermined range, the phase control method temporarily interrupting the supply of the alternating current to the heater in half cycles of the alternating current; and a hardware processor that: acquires element information indicating two or more electric elements that include the heater among the electric elements of the devices; acquires, before start of current supply to the electric elements indicated by the element information, rated power information indicating a rated power of the heater and consumption power information indicating a total consumption power of the electric elements indicated by the element information excluding the heater; calculates a remaining power by subtracting the total consumption power from an upper power limit allocated to the image forming apparatus, and calculates, as a consumption power allocatable to the heater, a maximum power that does not exceed both the rated power indicated by the rated power information and the calculated remaining power; obtains a duty ratio based on an assumption of current supply corresponding to the calculated maximum power according to pulse modulation, and determines whether the obtained duty ratio falls within or outside the predetermined range; and controls the drive circuit to supply the alternating current by the pulse modulation method when determining that the duty ratio falls within the predetermined range, and controls the drive circuit to supply the alternating current by the phase control method when determining that the duty ratio falls outside the predetermined range.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

In the drawings:

FIG. 3 illustrates an example of a consumption power table 201;

FIGS. 5A to 5C each illustrate an example of electric member list for a print mode;

FIG. 6 illustrates an example of an electric member list for a power saving mode;

FIG. 7 illustrates an example of an ON_DUTY correspondence table;

FIG. 10 illustrates a waveform 101 of voltage of a commercial power source 19, a waveform 102 of current of the commercial power source 19, a waveform 103 of a driving current of a fusing heater 53 under a first control method, a waveform 104 of the first control signal, a waveform 105 of a driving current of the fusing heater 53 under a second control method, and a waveform 106 of a second control signal;

DETAILED DESCRIPTION

Hereinafter, one or more embodiments of the present invention will be described with reference to the drawings. However, the scope of the invention is not limited to the disclosed embodiments.

1 Embodiment

The following describes an embodiment relating to the present invention with reference to the drawings.

Figure 1:
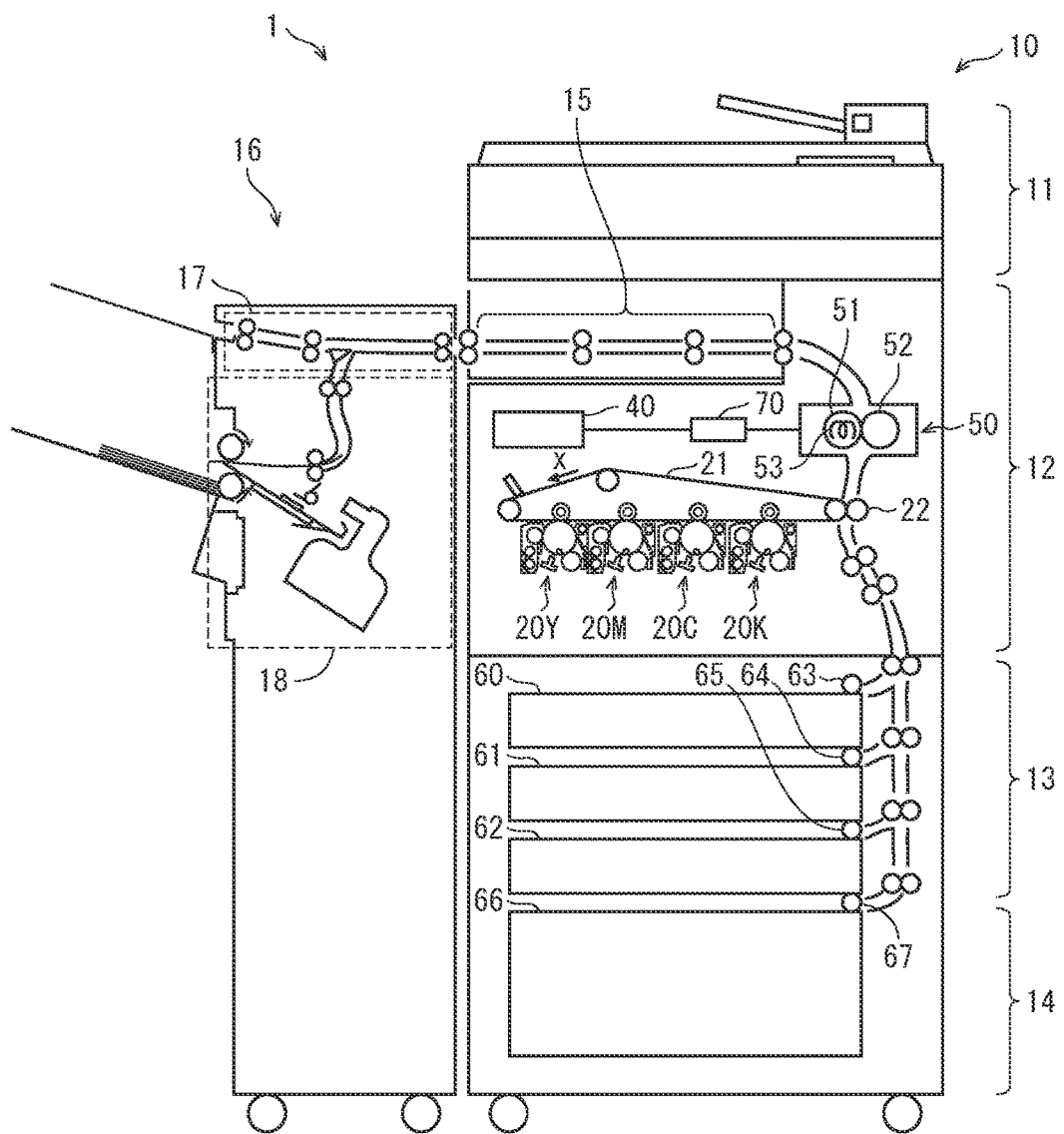
FIG. 1 is a schematic view illustrating configuration of an image forming system 1.

FIG. 1 is a schematic diagram illustrating configuration of an image forming system 1.

As illustrated in the figure, the image forming system 1 includes an image forming apparatus 10 and a post-processing apparatus 16 as an optional apparatus. The image forming apparatus 10 performs image formation on recording sheets according to an electronic photography system. The post-processing apparatus 16 performs post-processing such as stapling on recording sheets on which images have been formed and that are output from the image forming apparatus 10. Also, the image forming apparatus 10 includes, as an optional apparatus, a sheet feeding unit 14 (sheet feeding apparatus) that houses therein a large number of recording sheets for feeding.

Note that since the post-processing apparatus 16 and the sheet feeding unit 14 are optional apparatuses, there is a possibility that the post-processing apparatus 16 is not connected to the image forming system 1 and/or the sheet feeding unit 14 is not included in the image forming apparatus 10. However, the following description is provided based on an assumption that the post-processing apparatus 16 is connected to the image forming system 1 and the sheet feeding unit 14 is included in the image forming apparatus 10, except when specially mentioned.

The image forming system 1 operates while switching between three modes of a warm-up mode, a print mode, and a power saving mode.

In the image forming system 1, a series of electrostatic copying processes are performed by devices which are described later such as an image reader unit 11, a printer unit 12, a sheet feeding unit 13, the sheet feeding unit 14, and the post-processing apparatus 16, in further details, by devices constituting these units and apparatuses. The devices each have one or more electric members (electric elements). Examples of the electric members include motors, a heater, a light-emitting member such as an LED, a sensor such as a photodetector, electronic components, an LSI, a semiconductor memory, an electric wiring that are arranged in various circuit boards, and so on. These electric members consume power. Here, the electric members include the minimal electric members used for performing the electrostatic copying processes and one or more optional electric members used for performing processing as an addition to the electrostatic copying processes.

1.1 IMAGE FORMING APPARATUS 10

The image forming apparatus 10 is a tandem-type color multifunction peripheral (MFP) having functions of a scanner, a printer, and a copier.

The image forming apparatus 10 includes the image reader unit 11, the printer unit 12, and the sheet feeding unit 13, and further includes the sheet feeding unit 14 as an optional apparatus.

The image reader unit 11 has an automatic document feeder (ADF). The ADF conveys original documents stacked on a document tray piece by piece onto a document glass plate. The image reader unit 11 scans an image of an original document, which has been conveyed by the ADF onto a predetermined position on the document glass plate by movement of a scanner, and thereby to obtain image data composed of multi-level digital signals of red (R), green (G), and blue (B) colors.

The image data of the RGB color components obtained by the image reader unit 11 is subject to various processing by a main control unit 40 described later, and thus to be further converted into image data of reproduction colors of yellow (Y), magenta (M), cyan (C), and black (K).

The printer unit 12 performs image formation according to the electronic photography system. The printer unit 12 includes an intermediate transfer belt 21, a driving roller around which the intermediate transfer belt 21 is wound, a driven roller, a backup roller, image creation units 20Y, 20M, 20C, and 20K, a fusing unit 50, the main control unit 40, a drive circuit 70, and so on. The image creation units 20Y, 20M, 20C, and 20K are disposed facing the intermediate transfer belt 21 along a running direction X of the intermediate transfer belt 21 at predetermined intervals.

The image creation units 20Y, 20M, 20C, and 20K each include a photosensitive drum serving as an image carrier, an LED array for exposure-scanning of a surface of the photosensitive drum, a charger, a developer, a cleaner, a primary transfer roller, and so on.

The sheet feeding unit 13 includes sheet feeding cassettes 60, 61, and 62 that each house therein recording sheets of a different size and pickup rollers 63, 64, and 65 that pick up recording sheets from the sheet feeding cassettes 60, 61, and 62, respectively onto a conveyance path. The sheet feeding unit 14 as an optional apparatus includes a sheet feeding cassette 66 housing therein a large number of recording sheets and a pickup roller 67.

In the image creation units 20Y, 20M, 20C, and 20K, the photosensitive drums are uniformly charged by the charger, and are exposed by the LED array. As a result, electrostatic latent images are formed on surfaces of the photoconductive drums. The electrostatic latent images are developed by the developers of corresponding colors, and thus toner images of Y, M, C, and K colors are formed on the surfaces of the photoconductive drums of the corresponding colors. The toner images are sequentially transferred onto a surface of the intermediate transfer belt 21 by the action of an electrostatic force imposed by the primary transfer rollers that are disposed on a rear surface of the photosensitive drum 11.

Meanwhile, in accordance with a timing of image forming operations of the image creation units 20Y, 20M, 20C, and 20K, recording sheets are fed from the sheet feeding cassette of the sheet feeding unit 13 or the sheet feeding cassette of the sheet feeding unit 14 as an optional apparatus. The recording sheets are each conveyed to a position on the conveyance path where a secondary transfer roller 22 and the backup roller face each other with the intermediate transfer belt 21 sandwiched therebetween (secondary transfer position). The toner images of the Y, M, C, and K colors on the intermediate transfer belt 21 are secondarily transferred onto the recording sheet by the action of an electrostatic force imposed by the secondary transfer roller 22. The recording sheet onto which the toner images of the Y, M, C, and K colors have been secondarily transferred is further conveyed to the fusing unit 50.

A heater control unit 48, which is included in the main control unit 40 and is described later, switches between a first control method and a second control method. Also, the heater control unit 48 generates a control signal that repeatedly turns on and off and supplies the control signal to the drive circuit 70. The drive circuit 70 generates a driving current from a full-wave-rectified alternating current by switching with use of a control signal, and supplies the generated driving current to a fusing heater 53 (heater) heating a heating roller 51 (fusing member) included in the fusing unit 50. The details of the fusing heater 53 are described later. As a result, the heating roller 51 is heated by the fusing heater 53 to a target fusing temperature (target temperature, toner particle fusing temperature). Here, the first control method is a PWM method, and the second control method is a phase control method. According to the phase control method, in half cycles of an alternating current (in cycles of a full-wave-rectified current), supply of the alternating current to the fusing heater 53 is interrupted only for a predetermined time period in a time slot of rising of the alternating current.

A fusing nip is formed by bringing the heating roller 51 into pressure-contact with a pressing roller 52 in the fusing unit 50. When passing through the fusing nip, the recording sheet on which the toner images are formed is heated and pressed and thus the toner images on the recording sheet is fused onto the recording sheet. After passing through the fusing unit 50, the recording sheet is transmitted to a conveyance unit 15.

The recording sheet on which an image has been formed is output to the post-processing apparatus 16 by pairs of conveyance rollers that are arrayed along a horizontal conveyance path formed in the conveyance unit 15.

The image forming apparatus 10 includes an operation panel in an upper part thereof. The operation panel receives an input from a user and notifies the main control unit 40 of the received input. The input is for example a copy start instruction, settings of the number of copies, settings of copy conditions, whether to use the sheet feeding unit 14 as an optional apparatus, or settings of post-processing such as stapling by the post-processing apparatus 16 as an optional apparatus. Also, the operation panel includes a display unit that is composed of a liquid display panel or the like and displays user settings and various messages.

1.2 POST-PROCESSING APPARATUS 16

The post-processing apparatus 16 has, as post-processing functions, an alignment function of aligning a bundle of recording sheets (sheet bundle) and a stapling function of stapling the sheet bundle. In accordance with an instruction from the image forming apparatus 10, the post-processing apparatus 16 executes these functions.

As illustrated in FIG. 1, the post-processing apparatus 16 includes a conveyance path 17 and a post-processing unit 18.

In the case where post-processing such as sheet bundle alignment and stapling is not performed on recording sheets output from the conveyance unit 15, the recording sheets are conveyed on the conveyance path 17 and are ejected from a first sheet ejection tray.

Meanwhile, in the case where any post-processing is performed on recording sheets output from the conveyance unit 15, the recording sheets are conveyed to the post-processing unit 18 after branching from the conveyance path 17. The post-processing unit 18 aligns and staples a sheet bundle of the recording sheets, and the sheet bundle thus aligned and stapled are ejected from a second sheet ejection tray.

1.3 FUSING UNIT 50

Figure 9:
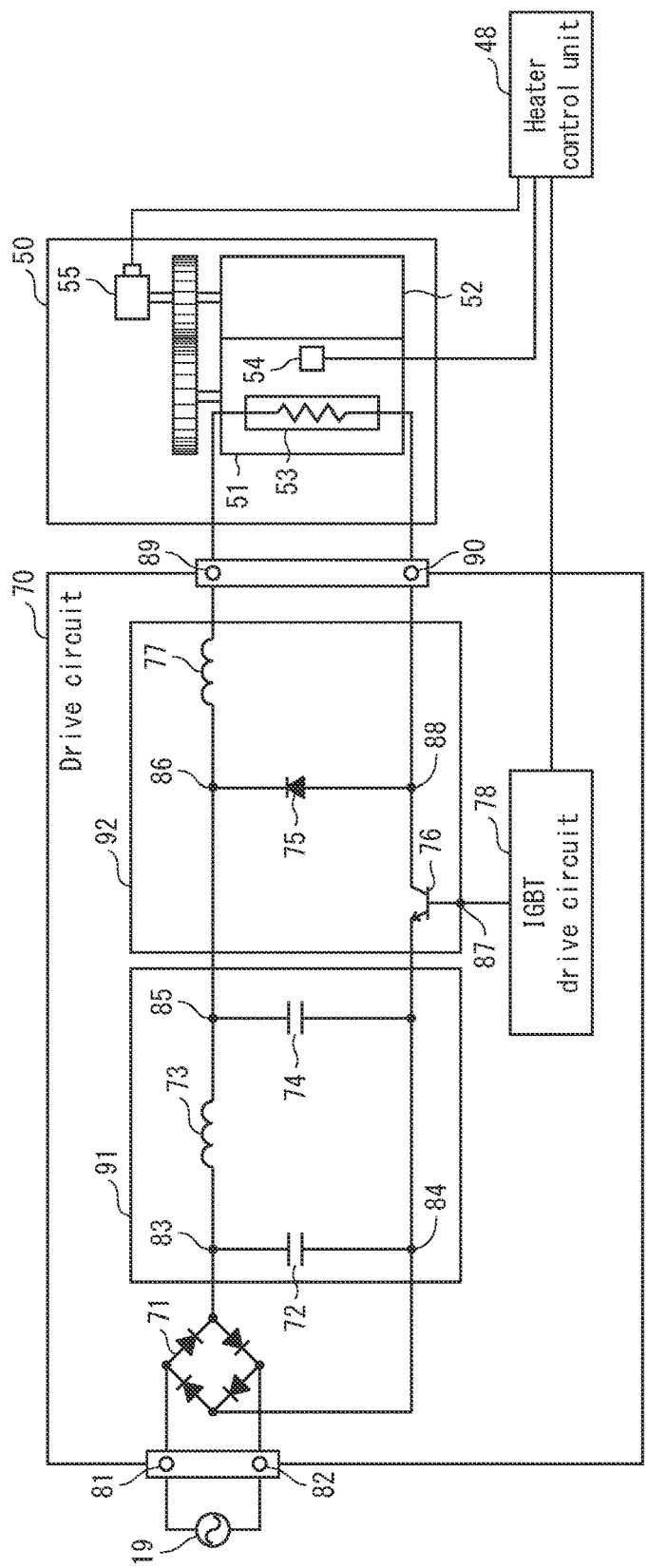
FIG. 9 illustrates configuration of a drive circuit 70 and peripheral circuits thereof.

The fusing unit 50 includes the heating roller 51, the pressing roller 52, a temperature sensor 54, a driving motor 55, and other members, as illustrated in its schematic cross-sectional view in FIG. 1 and schematic plan diagram in FIG. 9.

The heating roller 51 is made of a cylindrical metal core whose circumference is coated with a heat-resistant release layer. The metal core includes therein the fusing heater 53 serving as a heat source. The fusing heater 53 is for example a halogen heater. The fusing heater 53 has a rated power of for example 1300 W.

The temperature sensor 54 is provided facing the surface of the heating roller 51 so as to sense a surface temperature of the heating roller 51. The temperature sensor 54 senses the surface temperature of the heating roller 51, and the heater control unit 48 (FIG. 9) controls current supply to the fusing heater 53 such that the surface temperature of the heating roller 51 reaches the target temperature.

The pressing roller 52 is made of a cylindrical metal core whose circumferential surface is coated with a heat-resistant release layer.

The pressing roller 52 presses against the heating roller 51 by the action of a biasing force applied by a biasing member which is not illustrated. This results in generation of a fusing nip that is a contact region where the heating roller 51 and the pressing roller 52 contact each other.

Figure 2:
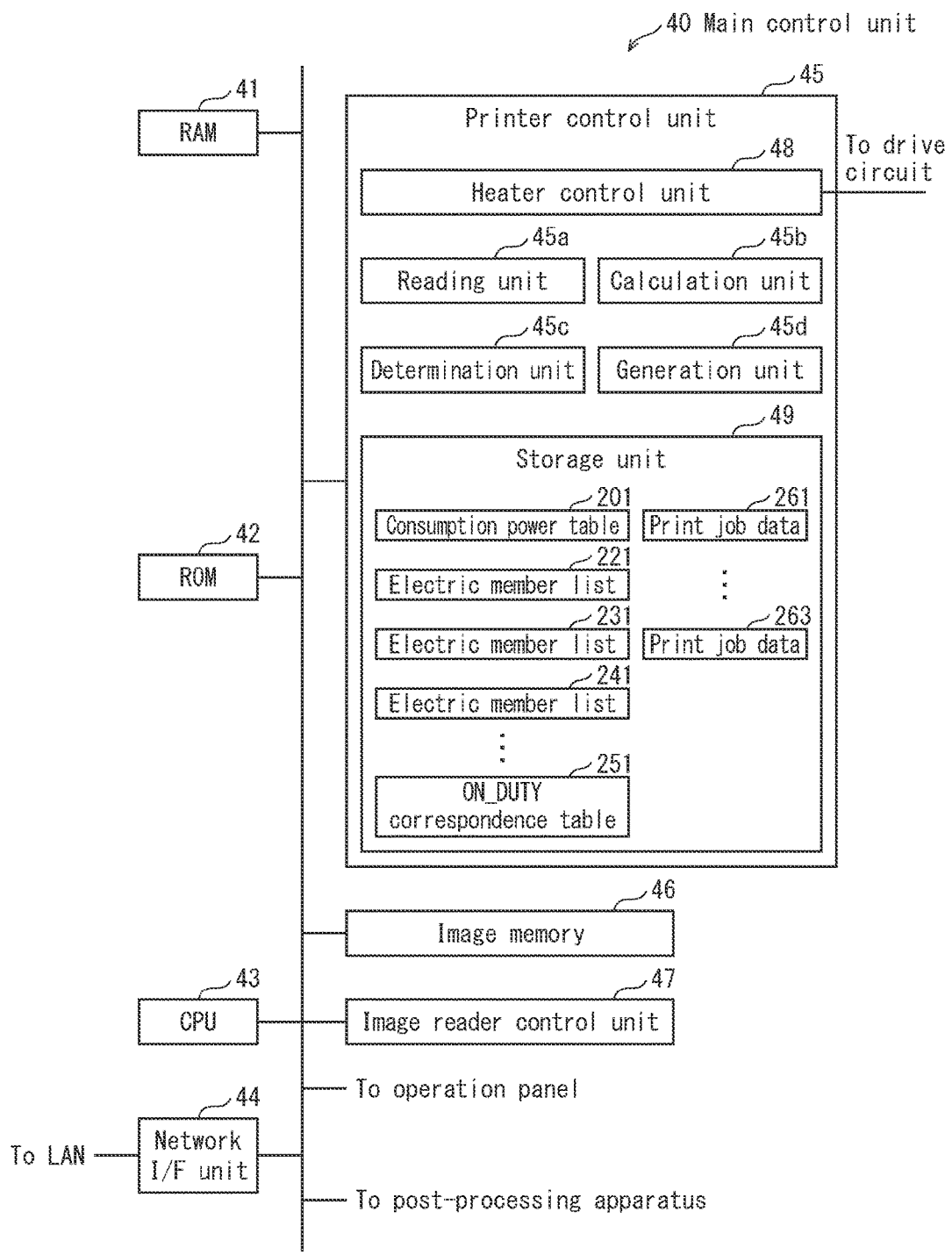
FIG. 2 is a block diagram illustrating configuration of a main control unit 40.

The pressing roller 52 rotates by the action of a rotation driving force of the driving motor 55 under control of a printer control unit 45 (FIG. 2, described later). The heating roller 51 is driven to rotate by rotation of the pressing roller 52.

1.4 MAIN CONTROL UNIT 40

The following describes configuration of the main control unit 40.

FIG. 2 is a block diagram illustrating the configuration of the main control unit 40.

The main control unit 40 includes, as illustrated in the figure, a RAM 41, a ROM 42, a CPU 43, a network I/F unit 44, the printer control unit 45, an image memory 46, an image reader control unit 47, and so on.

Upon receiving a power-on operation from a user, the main control unit 40 instructs the image reader unit 11, the printer unit 12, the sheet feeding units 13 and 14, the post-processing apparatus 16 to perform initial processing via the printer control unit 45, the image reader control unit 47, and so on. Also, the main control unit 40 instructs the printer control unit 45 to perform control for warm-up.

Here, warm-up is a process of heating the heating roller 51 to the toner particle fusing temperature that is the target temperature.

Further, upon receiving a print job via a user operation or upon receiving a print job from an external apparatus via the network I/F unit 44, the main control unit 40 instructs the printer control unit 45 to perform print processing.

Moreover, when a predetermined time period (five minutes for example) has elapsed since reception of the last print job, the main control unit 40 instructs the heater control unit 48 included in the printer control unit 45 to control temperature of the fusing heater 53 by the first control method for the power saving mode, thereby to switch the whole image forming system 1 to the power saving mode. Here, the first control method for the power saving mode is performed by controlling current supply to the fusing heater 53 by a PWM method according to which ON_DUTY (duty ratio) is 30%.

The printer control unit 45 performs unified control on a sheet feeding operation by the sheet feeding unit 13 or 14, an image creation operation by the image creation units 20Y, 20M, 20C, and 20K, and so on for an image forming operation. The printer control unit 45 includes therein a CPU, a ROM, and so on, and control the operations in accordance with a control program stored in the ROM.

The image reader control unit 47 controls the image reader unit 11 to perform a document image reading operation.

The RAM 41 temporarily stores therein various controlled variables and the number of copies set via the operation panel, and also provides a work area for program execution by the CPU 43.

The ROM 42 stores therein a control program for executing various jobs such as a copy operation.

The network I/F unit 44 receives a print job from an external terminal apparatus such as a personal computer (PC) via a network such as a LAN.

The CPU 43 operates in accordance with the control program stored in the ROM 42 to control the network I/F unit 44, the printer control unit 45, the image reader control unit 47, and so on. For example, upon reception of a print job via the network I/F unit 44, the CPU 43, which is operating in accordance with the control program, instructs the printer control unit 45 to perform an image forming operation based on data of the print job.

The image memory 46 temporarily stores therein image data of a print job and the like.

1.5 PRINTER CONTROL UNIT 45

The printer control unit 45 includes, as illustrated in FIG. 2, the heater control unit 48, a reading unit 45a, a calculation unit 45b, a determination unit 45c, a generation unit 45d, and a storage unit 49. Specifically, the printer control unit 45 includes therein the CPU, the ROM, and a RAM. Functions of the heater control unit 48, the reading unit 45a, the calculation unit 45b, the determination unit 45c, and the generation unit 45d are achieved by the CPU operating in accordance with the computer program stored in the ROM.

(1) Storage Unit 49

The storage unit 49 is for example composed of a non-volatile semiconductor memory. Note that the storage unit 49 is not limited to a semiconductor memory, and alternatively may be composed of a hard disk.

As illustrated in FIG. 2, the storage unit 49 stores therein a consumption power table 201, an ON_DUTY correspondence table 251, any one of electric member lists 221 (FIG. 4A), 222 (FIG. 4B), and 223 (FIG. 4C), an electric member list 241, and rated power information indicating the rated power (1300 W) of the fusing heater 53 which is not illustrated.

Also, in print processing, the storage unit 49 temporarily stores therein any one of electric member lists 231 (FIG. 5A), 232 (FIG. 5B), and 233 (FIG. 5C) corresponding to a print job and temporarily stores therein any one of print job data pieces 261 (FIG. 8A), 262 (FIG. 8B), and 263 (FIG. 8C) pertaining to the print job.

(Consumption Power Table 201)

The consumption power table 201 stores therein, for each mode, a consumption power with respect to each of the electric members constituting the image forming system 1.

Here, one of the electric members is the fusing heater 53, and the other electric members are the main body of the image forming apparatus 10 (excluding the fusing heater 53), the sheet feeding unit 14 as an optional apparatus, the respective motors included in the conveyance path 17 and the post-processing unit 18 of the post-processing apparatus 16, the light-emitting member such as an LED, the sensor such as a photodetector, the electronic components, the LSI, the semiconductor memory, the electric wiring that are arranged in various circuit boards, and so on. These electric members consume power.

Specifically, the consumption power table 201 for example stores therein consumption power information with respect to each of the electric members constituting the image forming system 1, as in FIG. 3 illustrating its data structure. The consumption power information is composed of electric member name, ID, and consumption power for each of three modes.

The electric member name expresses a name identifying an electric member. For the purpose of simplifying presentation of the consumption power table 201, the electric member name expresses not a name of an individual electric member but a name of a group composed of one or more electric members. The electric member name for example indicates the main body of the image forming apparatus 10 (excluding the fusing heater 53), the conveyance path 17 of the post-processing apparatus 16 as an optional apparatus 1, the post-processing unit 18 of the post-processing apparatus 16 as an optional apparatus 2, and the sheet feeding unit 14 as an optional apparatus 3.

The ID is identification information identifying an electric member. The consumption power for each of three modes expresses consumption power for each of the warm-up mode, the print mode, and the power saving mode. Note that letters "WU (warm-up)", "PR (print)", and "WT (waiting)" in the consumption power table 201 indicate the warm-up mode, the print mode, and the power saving mode, respectively. The consumption power in the consumption power table 201 indicates the total consumption power of electric members constituting a group identified by an electric member name.

Specifically, the consumption power table 201 includes consumption power information pieces 202, 203, 204, 205, and 206 corresponding to the main body (excluding the fusing heater), the fusing heater, and the optional apparatuses 1, 2, and 3, respectively.

For example, the consumption power information 202 corresponds to the main body (excluding the fusing heater), has ID "001", and indicates consumption power of "200 W", "400 W", and "100 W" corresponding to the warm-up mode, the print mode, and the power saving mode, respectively.

Also, the consumption power information 203 corresponds to the fusing heater 53, has ID "002", and indicates consumption power of "1300 W", "1300 W", and "390 W" corresponding to the warm-up mode, the print mode, and the power saving mode, respectively. Here, the power "1300 W" is the rated power of the fusing heater 53.

(Electric Member Lists)

The electric member lists each include IDs of electric members that need to be operated for each pattern among the electric members constituting the image forming system 1. In other words, the electric member lists are each element information indicating two or more electric members. Here, the pattern indicates a single unified operation in the image forming system 1. The warm-up mode and the print mode each include one or more patterns. The power saving mode for example includes one pattern. One combination of one or more electric members is determined for each pattern. The combination is indicated by the following electric member list.

Figure 4A:
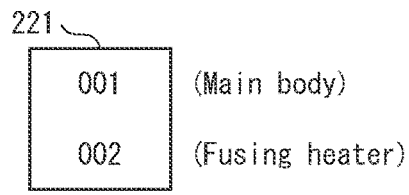
FIGS. 4A to 4C each illustrate an example of electric member list for a warm-up mode.
Figure 4B:
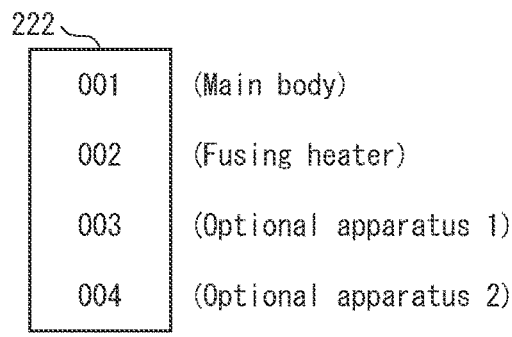
Figure 4C:
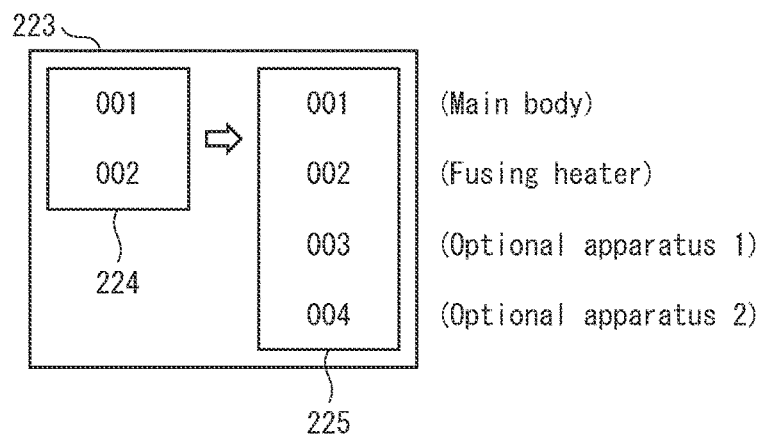

For example, the electric member lists 221, 222, and 223 illustrated in FIGS. 4A, 4B, and 4C, respectively each include IDs of electric members that need to be operated in the warm-up mode. The electric member lists 221, 222, and 223 have been determined in advance. The storage unit 49 stores therein any one of the electric member lists 221, 222, and 223 according to the optional apparatus configuration in the image forming system 1, for example according to whether the post-processing apparatus 16 is connected to the image forming system 1, whether the sheet feeding unit 14 is included in the image forming apparatus 10, and so on. Instead of this, the storage unit 49 may store therein the electric member lists 221, 222, and 223 and any one of the electric member lists 221, 222, and 223 may be selected according to the optional apparatus configuration in the image forming system 1.

The electric member list 221 illustrated in FIG. 4A includes IDs "001" and "002" that indicate the main body (excluding the fusing heater) and the fusing heater, respectively. In this case, the warm-up mode includes one pattern, and the electric member list 221 corresponds to this one pattern of the warm-up mode. When the power is on, current is supplied to the main body (excluding the fusing heater) and the fusing heater in the one pattern of the warm-up mode. This is a single unified operation. Also, the electric member list 221 does not include any ID identifying an optional apparatus. This indicates for example a status of the image forming system 1 in which the post-processing apparatus 16 is not connected to the image forming system 1 and the sheet feeding unit 14 is not included in the image forming apparatus 10. When a power-off status is regarded as a power-off pattern, power-on switches from the power-off pattern to the pattern of the warm-up mode.

Here, the electric member list 221 indicates electric members constituting one combination. These electric members are for example the minimal electric members used for performing electrostatic copying processes in the image forming system 1.

Also, the electric member list 222 illustrated in FIG. 4B includes IDs "001", "002", "003", and "004" that indicate the main body (excluding the fusing heater), the fusing heater, the optional apparatus 1, and the optional apparatus 2, respectively. In this case, the warm-up mode includes one pattern, and the electric member list 222 corresponds to this one pattern of the warm-up mode. When the power is on, current is supplied to the main body (excluding the fusing heater), the fusing heater, the optional apparatuses 1 and 2 in the one pattern of the warm-up mode. This is a single unified operation. Also, the electric member list 222 includes respective IDs identifying the optional apparatuses 1 and 2. This indicates for example a status of the image forming system 1 in which the post-processing apparatus 16 is connected to the image forming system 1.

Here, the electric member list 222 indicates electric members constituting one combination. These electric members include the minimal electric members used for performing electrostatic copying processes in the image forming system 1 and one or more optional electric members used for performing processing as an addition to the electrostatic copying processes.

Furthermore, the electric member list 223 illustrated in FIG. 4C includes electric member lists 224 and 225. In the warm-up mode, operations of electric members indicated in the electric member list 224 are followed by operations of electric members indicated in the electric member list 225. Specifically, the electric member list 224 includes the IDs "001" and "002", and the electric member list 225 includes the IDs "001", "002", "003", and "004". The IDs "001", "002", "003", and "004" indicate the main body (excluding the fusing heater), the fusing heater, the optional apparatus 1, and the optional apparatus 2, respectively. In this case, the warm-up mode includes two patterns, namely a first pattern and a second pattern. The electric member lists 224 and 225 correspond to the first pattern and the second pattern of the warm-up mode, respectively. When the power is on, the image forming system 1 switches to the first pattern of the warm-up mode in which current is supplied to the main body (excluding the fusing heater) and the fusing heater. This is a single unified operation. Then, the image forming system 1 switches from the first pattern to the second pattern of the warm-up mode in which current is supplied to the main body (excluding the fusing heater), the fusing heater, and the optional apparatuses 1 and 2. This is also a single unified operation. Moreover, the electric member list 225 includes the respective ID identifying the optional apparatuses 1 and 2. This indicates for example a status of the image forming system 1 in which the post-processing apparatus 16 is connected to the image forming system 1.

Here, the electric member list 224 indicates electric members constituting one combination. These electric members are for example the minimal electric members used for performing electrostatic copying processes in the image forming system 1. Also, the electric member list 225 indicates electric members constituting one combination. These electric members include the minimal electric members used for performing electrostatic copying processes in the image forming system 1 and one or more optional electric elements used for performing processing as an addition to the electrostatic copying processes.

Next, the electric member lists 231, 232, and 233, which are illustrated in FIGS. 5A, 5B, and 5C, respectively, each include IDs of electric members that need to be operated in the print mode. Upon reception of a print job, any one of the electric member lists 231, 232, and 233 corresponding to the received print job is generated based on the print job.

The electric member list 231 includes the IDs "001", "002", and "003". Also, the electric member list 232 includes the IDs "001", "002", "003" and "004". Further, the electric member list 233 includes the IDs "001", "002", "003" and "005".

The print mode includes a plurality of patterns each corresponding to a print job. The electric member lists 231, 232, and 233 for example correspond to first, second, and third patterns in the print mode, respectively. In the case where respective three print jobs corresponding to the electric member lists 231, 232, and 233 are executed in the stated order, the image forming system 1 switches for example from a pattern of the warm-up mode to the first pattern of the print mode, switches from the first pattern to the second pattern of the print mode, and then switches from the second pattern to the third pattern of the print mode in the stated order.

Next, the electric member list 241 illustrated in FIG. 6 includes IDs of electric members that need to be operated in the power saving mode, namely the IDs "001", "002", and "003". In this case, the power saving mode includes one pattern, and the electric member list 241 corresponds to this one pattern of the power saving mode. For example, the image forming system 1 switches from a pattern of the print mode to the one pattern of the power saving mode in which current is supplied to the main body (excluding the fusing heater), the fusing heater, and the optional apparatus 1. This is a single unified operation. Note that the power saving mode may include a plurality of patterns.

Here, the electric member lists 231, 232, 233, and 241 each indicate electric members constituting one combination. These electric members include the minimal electric members used for performing electrostatic copying processes in the image forming system 1 and one or more optional electric elements used for performing processing as an addition to the electrostatic copying processes.

(ON_DUTY correspondence table 251)

The ON_DUTY correspondence table 251 is for example composed of a plurality of pairs of consumption power of the fusing heater and ON_DUTY as illustrated in FIG. 7.

The ON_DUTY correspondence table 251 is used for obtaining ON_DUTY from consumption power of the fusing heater.

The consumption power indicates consumption power allocatable to the fusing heater, and the ON_DUTY indicates a duty ratio corresponding to the consumption power.

(Print Job Data)

In execution of a print job, print job data is generated by the image forming apparatus 10 or is externally received.

Figure 8A:
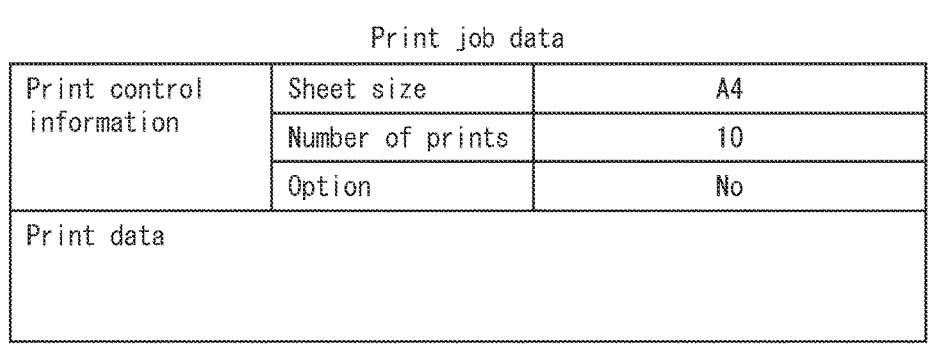
FIGS. 8A to 8C each illustrate an example of print job data pertaining to a print job.
Figure 8B:
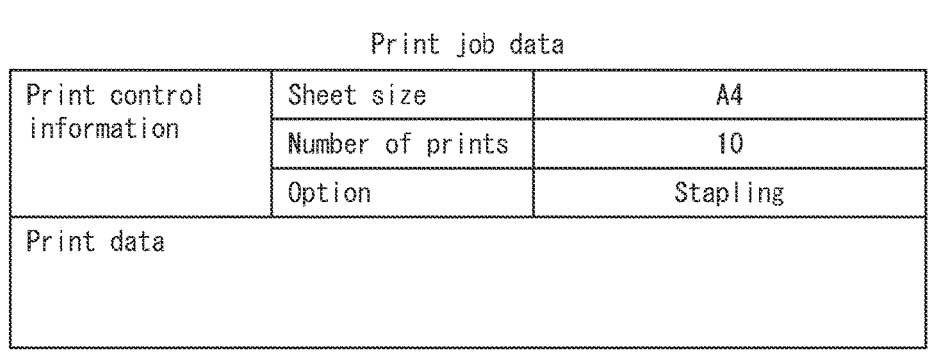
Figure 8C:
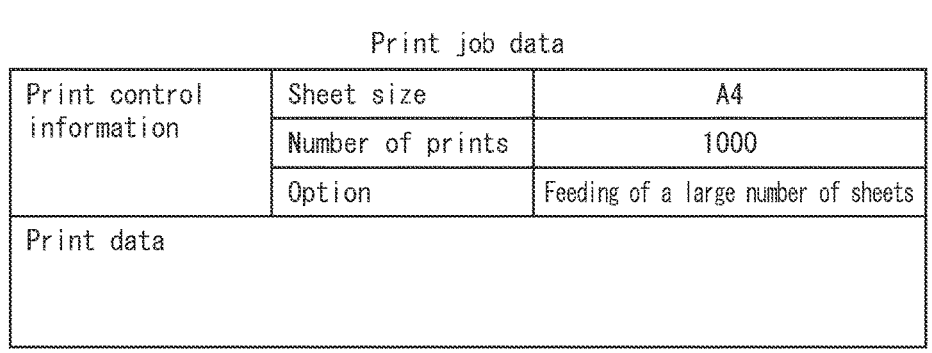

The print job data is composed of print control information and print data as illustrated in FIGS. 8A-8C. The print control information is data indicating print conditions necessary in the print mode, such as the sheet size, the number of prints, and option designation. For example, the sheet size indicates the size of recording sheets for printing, the number of prints indicates the number of recording sheets for printing, and the option designation indicates an optional function used in printing recording sheets. The print data indicates data for printing, and is composed of text data, graphic data, photographic data, and so on.

Print job data 261 illustrated in FIG. 8A includes, as print control information, the sheet size "A4", the number of prints "10", and no option designation.

Print job data 262 illustrated in FIG. 8B includes, as print control information, the sheet size "A4", the number of prints "10", and option designation of sheet bundle stapling.

Print job data 263 illustrated in FIG. 8C includes, as print control information, the sheet size "A4", the number of prints "1000", and option designation of feeding of a large number of recording sheets.

(2) Reading Unit 45a

The reading unit 45a performs the following operations as below. The reading unit 45a acquires an electric member list indicating electric members including the fusing heater 53. Before start of current supply to the electric members indicated by the acquired electric member list, the reading unit 45a acquires the rated power information indicating the rated power of the fusing heater 53 and acquires consumption power information indicating the total consumption power of the electric members indicated by the acquired electric member list excluding the fusing heater 53 with use of the acquired electric member list.

(Warm-Up Mode)

At the start of the warm-up mode, the reading unit 45a reads an electric member list for the warm-up mode from the storage unit 49, and reads the rated power information. Then, with respect to each of all IDs included in the read electric member list, the reading unit 45a reads a consumption power for the warm-up mode from the consumption power table 201 stored in the storage unit 49, and outputs the read consumption power and the rated power indicated by the rated power information to the calculation unit 45b.

(Print Mode)

At the start of the print mode, the reading unit 45a reads print control information included in print job data pertaining to a target print job from the storage unit 49, and reads the rated power information. The reading unit 45a outputs the read print control information to the generation unit 45d.

Then, with respect to each of all IDs included in an electric member list generated by the generation unit 45d, the reading unit 45a reads a consumption power for the print mode from the consumption power table 201 stored in the storage unit 49, and outputs the read consumption power and the rated power indicated by the rated power information to the calculation unit 45b.

(Power Saving Mode)

At the start of the power saving mode, the reading unit 45a reads an electric member list for the power saving mode from the storage unit 49. Then, with respect to each of all IDs included in the read electric member list, the reading unit 45a reads a consumption power for the power saving mode from the consumption power table 201 stored in the storage unit 49, and outputs the read consumption power to the calculation unit 45b.

(3) Calculation Unit 45b

The calculation unit 45b performs the following operations as below. The calculation unit 45b calculates a remaining power by subtracting, from the upper power limit allocated to the image forming system 1, the total consumption power indicated by the consumption power information (consumption power of the electric members indicated by the electric member list excluding the fusing heater 53). The calculation unit 45b calculates, as a consumption power allocatable to the fusing heater 53, the maximum power that does not exceed both the calculated remaining power and the rated power indicated by the rated power information.

(Warm-Up Mode)

The calculation unit 45b calculates, as power allocatable to the fusing heater 53 (allocatable consumption power), the highest possible power (maximum power) that does not exceed both the rated power of the fusing heater 53 and a remaining power that is calculated by subtracting consumption power of the other electric members excluding the fusing heater 53 from an upper power limit allocated to the image forming system 1.

At this time, the calculation unit 45b may calculate the consumption power allocatable to the fusing heater 53 in consideration of a present heat amount of the heating roller 51 (in other words, a present temperature of the circumferential surface of the heating roller 51). Alternatively, the calculation unit 45b may calculate, as the consumption power allocatable to the fusing heater 53, power of a predetermined percentage to the maximum power, for example power of 90% to the maximum power.

The calculation unit 45b calculates the sum of consumption power read by the reading unit 45a.

In the case where the sum of consumption power exceeds the upper power limit, the calculation unit 45b calculates an excess power by the following equation.

Excess power=sum of consumption power−upper power limit

Also, the calculation unit 45b calculates the highest possible power allocatable to the fusing heater 53 that does not exceed the rated power of the fusing heater 53 by the following equation.

Allocatable power=rated power of fusing heater 53−excess power

Here, the sum of consumption power needs not to exceed the upper power limit allocated to the image forming system 1.

In other words, the calculation unit 45b calculates, as the power allocatable to the fusing heater 53, the highest possible power that does not exceed both the rated power of the fusing heater 53 and the remaining power that is calculated by subtracting consumption power of the image forming system 1 excluding the fusing heater 53 from the upper power limit allocated to the image forming system 1.

Further, the calculation unit 45b obtains ON_DUTY with use of the ON_DUTY correspondence table 251 stored in the storage unit 49, based on an assumption that the fusing heater 53 is supplied with a current corresponding to the calculated maximum power according to the PWM method. Specifically, the calculation unit 45b searches the ON_DUTY correspondence table 251 for a consumption power that is equal to the power allocatable to the fusing heater 53, and reads ON_DUTY corresponding to a consumption power found as a result of the search. Note that in the case where the ON_DUTY correspondence table 251 does not include consumption power that is equal to the power allocatable to the fusing heater 53, ON_DUTY corresponding to the power allocatable to the fusing heater 53 may be obtained as follows: the ON_DUTY correspondence table 251 is searched for a consumption power that is the closest to the power allocatable to the fusing heater 53, and calculation is performed by linear interpolation using the found closest consumption power, a consumption power that is positioned before (or after) the closest consumption power in the ON_DUTY correspondence table 251, and ON_DUTY corresponding to each of the closest consumption power and the consumption power positioned therebefore (thereafter).

Here, it is considered that the ON_DUTY corresponds to a ratio of the power allocatable to the fusing heater 53 to the rated power of the fusing heater 53.

The calculation unit 45b outputs the obtained ON_DUTY to the determination unit 45c.

(Print Mode)

The calculation unit 45b calculates a power allocatable to the fusing heater 53 as follows like in the warm-up mode.

The calculation unit 45b calculates the sum of consumption power read by the reading unit 45a.

In the case where the sum of consumption power exceeds the upper power limit, the calculation unit 45b calculates a time rate that is a rate of a time period of current supply in one cycle of an alternating current. Specifically, in execution of a subsequent print job, the calculation unit 45b calculates a consumption power allocatable to the fusing heater 53 in consideration of (i) consumption power that is determined by a combination of the main body, the fusing heater 53, and an optional apparatus (see the electric member lists illustrated in FIGS. 5A-5C) (this consumption power is calculated based on the consumption power table 201 illustrated in FIG. 3) and (ii) a present heat amount of the heating roller 51 (in other words, a present temperature of the circumferential surface of the heating roller 51). Then, the calculation unit 45b calculates a time rate corresponding to the allocatable consumption power for example based on a correspondence table stored therein beforehand between consumption power and time rate. The calculation unit 45b outputs the calculated time rate to the determination unit 45c.

(Power Saving Mode)

The calculation unit 45b calculates the sum of consumption power read by the reading unit 45a.

(4) Determination Unit 45c

The determination unit 45c determines whether the ON_DUTY obtained by the calculation unit 45b falls within or outside a predetermined range, as below.

Also, the determination unit 45c compares temperature sensed by the temperature sensor 54 with the target temperature.

Further, the determination unit 45c compares the sum of consumption power with the upper power limit allocated to the image forming system 1.

(Warm-Up Mode)

In the warm-up mode, the determination unit 45c determines whether the ON_DUTY obtained by the calculation unit 45b falls within or outside a range of 71%-99%, in other words, determines whether the ON_DUTY exceeds 70%. Here, 70% is a threshold value for ON_DUTY. Also, a range of ON_DUTY blow 70% is referred to as predetermined range.

(Print Mode)

In the print mode, the determination unit 45c determines whether the time rate calculated by the calculation unit 45b is lower than 90%. Here, 90% is a threshold value (predetermined value) for time rate.

Here, in the case where a print job is executed with an optional apparatus after control of current supply to the fusing heater 53 by the second control method and completion of warm-up, the whole consumption power increases by a consumption power of the optional apparatus compared with in the warm-up mode. This necessitates further suppression of power supply to the fusing heater 53. In such a case, control is performed to switch from the second control method to the first control method and set the ON_DUTY to 70% or lower. At this time, it is determined as to whether to switch from the second control method to the first control method in accordance with whether a power factor of an input current estimated by calculation of the time rate of the fusing heater 53 is equal to or higher than the threshold value in a region of ON_DUTY at which a recovery current is generated, that is, in a region of ON_DUTY of 71% or higher. The threshold value is for example 90% described above. Note that the threshold value is not limited to 90% because the tolerable range of power factor varies depending on the apparatus configuration.

Here, the predetermined range, which indicates the range of ON_DUTY below 70%, is a limit range within which a recovery current is not generated in a freewheel diode 75 included in a chopper circuit 92 (FIG. 9) which is described later.

(Power Saving Mode)

In the power saving mode, the determination unit 45c performs no processing because the sum of consumption power cannot exceed the upper power limit allocated to the image forming system 1.

(5) Generation Unit 45d

In the print mode, the generation unit 45d generates an electric member list with use of read print control information as follows.

The generation unit 45d generates an electric member list that inevitably includes the IDs "001" (the main body), "002" (the fusing heater 53), and "003" (the conveyance path 17). This is because the main body, the fusing heater 53, and the conveyance path 17 inevitably operate in the print mode.

Next, the generation unit 45d determines whether the print control information includes option designation. When determining that the print control information includes no option designation, the generation unit 45d ends generation of the electric member list. When determining that the print control information includes any option designation, the generation unit 45d adds an ID corresponding to the option designation to the electric member list. In the case for example where the option designation indicates "stapling", the generation unit 45d adds the ID "004" (the post-processing unit 18) to the electric member list. In the case for example where the option designation indicates "feeding of a large-number of sheets", the generation unit 45d adds the ID "005" (the sheet feeding unit 14) to the electric member list.

(6) Heater Control Unit 48

The heater control unit 48 performs the following operations as below. In the case where the ON_DUTY is determined to fall within the predetermined range, the heater control unit 48 controls the drive circuit 70 to perform current supply by the first control method. In the case where the ON_DUTY is determined to fall outside the predetermined range, the heater control unit 48 controls the drive circuit 70 to perform current supply by the second control method.

Also, the heater control unit 48 acquires the surface temperature of the heating roller 51 from the temperature sensor 54.

(Warm-Up Mode)

In the case where the determination unit 45c determines that obtained ON_DUTY falls within the range of 71%-99%, the heater control unit 48 controls current supply to the fusing heater 53 by the second control method. Here, the second control method is the phase control method, according to which in cycles of a full-wave-rectified current (in half cycles of alternating current), supply of the alternating current to the fusing heater 53 is interrupted only for a predetermined time period in a time slot of rising of the alternating current. Here, the predetermined time period may be determined depending on a heat amount to be supplied to the fusing heater 53.

Meanwhile, in the case where the determination unit 45c determines that the obtained ON_DUTY falls outside the range of 71%-99%, the heater control unit 48 controls current supply to the fusing heater 53 by the first control method for the print mode. Here, the first control method for the print mode is control of current supply to the fusing heater 53 by the PWM method according to which the ON_DUTY is 70%.

In the case where the sum of consumption power is lower than or equal to the upper power limit, the heater control unit 48 controls current supply to the fusing heater 53 by flowing a current to the fusing heater 53 at the rated power of the fusing heater 53.

(Print Mode)

In the case where the determination unit 45c determines that a calculated time rate is lower than 90%, the heater control unit 48 controls current supply to the fusing heater 53 by the first control method for the print mode.

According to the first control method, since a driving current output to the fusing heater 53 has a waveform near a sinusoidal waveform, improvement of the power factor is expected. For this reason, in the case where the time rate is determined to be lower than 90%, current supply to the fusing heater 53 is controlled by the first control method as described above.

Meanwhile, in the case where the determination unit 45c determines that the calculated time rate is equal to or higher than 90%, the heater control unit 48 controls current supply to the fusing heater 53 by the second control method.

(Power Saving Mode)

In the power saving mode, the heater control unit 48 controls current supply to the fusing heater 53 by the first control method for the power saving mode. Here, the first control method for the power saving mode is performed by controlling current supply to the fusing heater 53 by the PWM method according to which the ON_DUTY is 30% as described above.

1.6 DRIVE CIRCUIT 70

The drive circuit 70 controls supply of an alternating current from the commercial power source 19 (alternating-current power source, FIG. 9) to the fusing heater 53 by switching between the first control method and the second control method. According to the first control method, an actual usage range of ON_DUTY is a predetermined value (70%) or lower. According to the second control method, current supply to the fusing heater 53 is temporarily interrupted in half cycles of the alternating current from the commercial power source 19.

(1) Configuration of Drive Circuit 70

The drive circuit 70 includes, as illustrated in FIG. 9, a rectifier circuit 71, a noise filter 91, a chopper circuit 92, and an insulated gate bipolar transistor (IGBT) drive circuit 78. The drive circuit 70 also includes terminals 81, 82, 89, and 90 for connection to external circuits and so on and other terminals which are not illustrated.

The drive circuit 70 is connected to the commercial power source 19 which supplies an alternating current, via the terminals 81 and 82. Also, the drive circuit 70 is connected to the fusing heater 53 via the terminals 89 and 90. Further, the drive circuit 70 is connected to the heater control unit 48 via the other terminals.

Here, the commercial power source 19 outputs alternating current having a voltage waveform 101 and a current waveform 102 illustrated in FIG. 10.

(Rectifier Circuit 71)

As illustrated in FIG. 9, the rectifier circuit 71 is connected on its input side to the commercial power source 19 via the terminals 81 and 82, and is connected on its output side to the noise filter 91 via nodes 83 and 84. The rectifier circuit 71 full-wave-rectifies a single-phase alternating current supplied from the commercial power source 19, and supplies the full-wave-rectified current has been performed (having a waveform 107 illustrated in FIG. 10) to the noise filter 91. The rectifier circuit 71 is for example a bridge rectifier circuit that is composed of a combination of four rectifier elements.

(Noise Filter 91)

The noise filter 91 is connected on its input side to the rectifier circuit 71 via the nodes 83 and 84, and is connected on its output side to the chopper circuit 92 via the nodes 85 and 84. The noise filter 91 reduces noise in order to prevent propagation of noise generated in the image forming apparatus 10 to the commercial power source 19. Specifically, the noise filter 91 is for example a 7E filter that is composed of a coil 73, and capacitors 72 and 74. A first terminal of the coil 73 and a first terminal of the capacitor 72 are connected to the node 83. Also, a second terminal of the coil 73 and a first terminal of the capacitor 74 are connected to the node 85. Furthermore, a second terminal of the capacitor 72 and a second terminal of the capacitor 74 are connected to the node 84.

(Chopper Circuit 92)

The chopper circuit 92 is connected on its input side to the noise filter 91 via the nodes 84 and 85, and is connected on its output side to the fusing heater 53 via the terminals 89 and 90. The chopper circuit 92 is for example a step-down chopper circuit that is composed of a reactor (coil) 77, a freewheel diode 75, and a switching element 76.

The switching element 76 is for example an IGBT or a metal-oxide-semiconductor field-effect transistor (MOSFET).

A first terminal of the reactor 77 and a cathode of the freewheel diode 75 are connected to a node 86. Also, a second terminal of the reactor 77 is connected to the terminal 89, and an anode of the freewheel diode 75 is connected to a node 88 (that is, the terminal 90). A collector of the switching element 76 is connected to the node 88, an emitter of the switching element 76 is connected to the node 84, and a gate of the switching element 76 is connected to the IGBT drive circuit 78 via the node 87.

The switching element 76 repeatedly turns on and off in accordance with a control signal output from the IGBT drive circuit 78.

(IGBT Drive Circuit 78)

The IGBT drive circuit 78 illustrated in FIG. 9 receives designation of control method, ON_DUTY, and switching frequency from the heater control unit 48.

The IGBT drive circuit 78 generates a control signal based on the designation of control method, ON_DUTY, and switching frequency received from the heater control unit 48, and outputs the generated control signal to the gate of the switching element 76.

The control signal includes a first control signal and a second control signal. The IGBT drive circuit 78 generates the first control signal for a time period, and generates the second control signal for another time period. The first control signal and the second control signal have a waveform 104 and a waveform 106 illustrated in FIG. 10, respectively.

In the case where the received designation of control method indicates the first control method, the IGBT drive circuit 78 generates the first control signal that repeatedly turns on and off at a predetermined ON_DUTY and a predetermined switching frequency.

Here, when the image forming system 1 is in the power saving mode, the first control signal for example has ON_DUTY of 30% or a value close to 30% and switching frequency of 35 kHz. Meanwhile, when the image forming system 1 is in the print mode, the first control signal for example has ON_DUTY of 70% or a value close to 70% and switching frequency of 25 kHz.

Meanwhile, in the case where the received designation of control method indicates the second control method, the IGBT drive circuit 78 generates the second control signal. In cycles of a full-wave-rectified current generated by the rectifier circuit 71, that is, in half cycles of alternating current, the second control signal repeatedly performs interruption (turn-off) of supply of the full-wave-rectified current to the fusing heater 53 only for a predetermined time period (time period 106a in FIG. 10) and supply (turn-on) of the full-wave-rectified current to the fusing heater 53 for a remaining time period (time period 106b in FIG. 10) in a time slot of rising of the full-wave-rectified current.

Here, an off time period in one cycle of the second control signal has for example a rate of 80%. Also, the predetermined time period is equivalent to the off time period in one cycle of the second control signal. In the case for example where an alternating current has frequency of 50 Hz, the predetermined time period is 0.004 seconds.

(2) Operations of Chopper Circuit 92

The following describes the operations of the chopper circuit 92.

The switching element 76 repeatedly turns on and off in accordance with the control signal repeatedly turning on and off.

Figure 11:
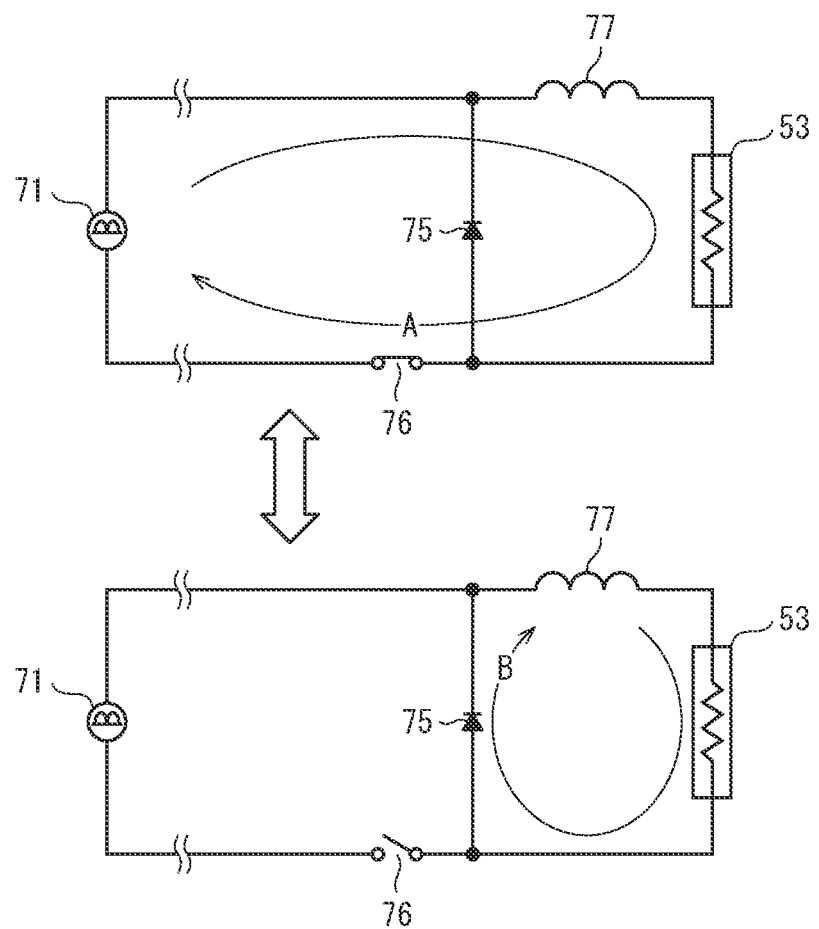
FIG. 11 illustrates current flowing through the fusing heater 53 during an on-period of a switching element 76 on an upper stage and current flowing through the fusing heater 53 during an off-period of the switching element 76 on a lower stage.

When the switching element 76 turns on, a full-wave-rectified current generated by the rectifier circuit 71 flows through the reactor 77 and the fusing heater 53 via the switching element 76 as indicated by an arrow A on the upper stage in FIG. 11. In this time period, the reactor 77 stores therein part of the current flowing therethrough as magnetic energy.

Meanwhile, when the switching element 76 turns off, the magnetic energy stored in the reactor 77 while the switching element 76 has been on is released as current and starts flowing through the fusing heater 53 as indicated by an arrow B on the lower stage in FIG. 11. This current returns to the reactor 77 via the freewheel diode 75 serving as a generative diode.

(3) Waveform of Current Flowing Through Fusing Heater 53

FIG. 10 illustrates a waveform 103 of current flowing through the fusing heater 53 by the first control method and a waveform 105 of current flowing through the fusing heater 53 by the second control method.

Here, it is desirable that the switching frequency in the first control method should not be set to 20 kHz or lower. A switching frequency within an audible range of 20 kHz or lower causes vibration of the reactor 77, and thus causes a problem of noise generation in the image forming apparatus 10. For this reason, the switching frequency of the first control signal falls outside the audible range both in the case where ON_DUTY is 70% or a value close to 70% and the case where the ON_DUTY is 30% or a value close to 30%.

Also, as described above, the current having the waveform 103 illustrated in FIG. 10 is discontinuous. This current discontinuity is important in order to suppress noise generation.

Assume, the case for example where, in the print mode, switching frequency is set to a relative high value such as 35 kHz and ON_DUTY is set to a relative high value such as approximately 70%, or the ON_DUTY is set to a relative high value such as approximately 80%. In such a case, before current B illustrated on the lower stage in FIG. 11 decreases to zero, next current A illustrated on the upper stage in FIG. 11 starts rising. This results in possibility of both the current A and B flow for the same time period. Due to this, when the cycle switches, a current value does not reach zero (current continuously flows), a recovery current flows through the freewheel diode 75, and this increases recovery noise. Furthermore, turn-on of the switching element 76 during current flowing through the freewheel diode 75 generates a switching loss and this increases temperature of the switching element 76.

Figure 12:
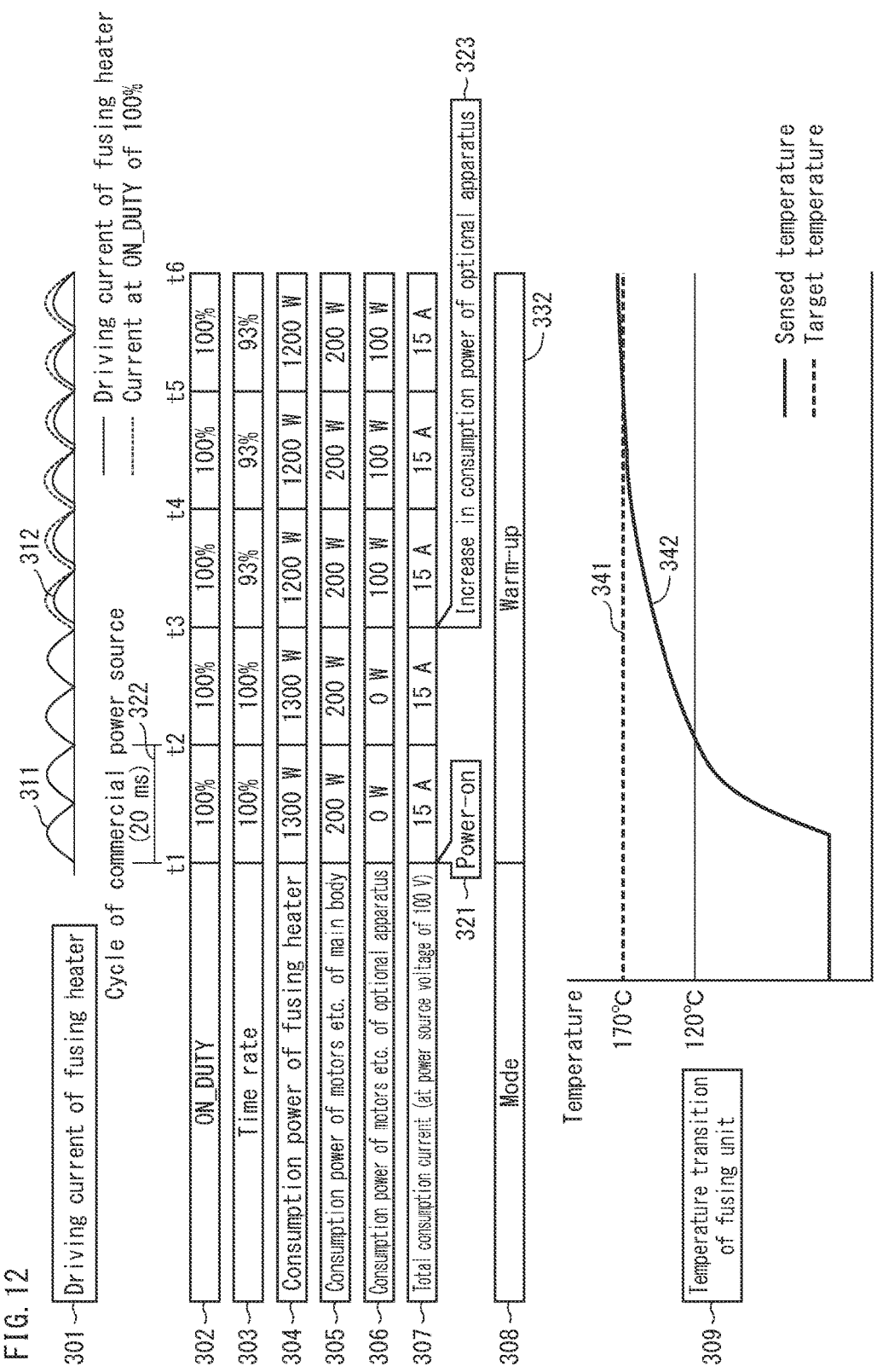
FIG. 12 illustrates a waveform of a driving current flowing through the fusing heater 53 starting immediately after power-on, and so on, continuing to FIG. 13.
Figure 13:
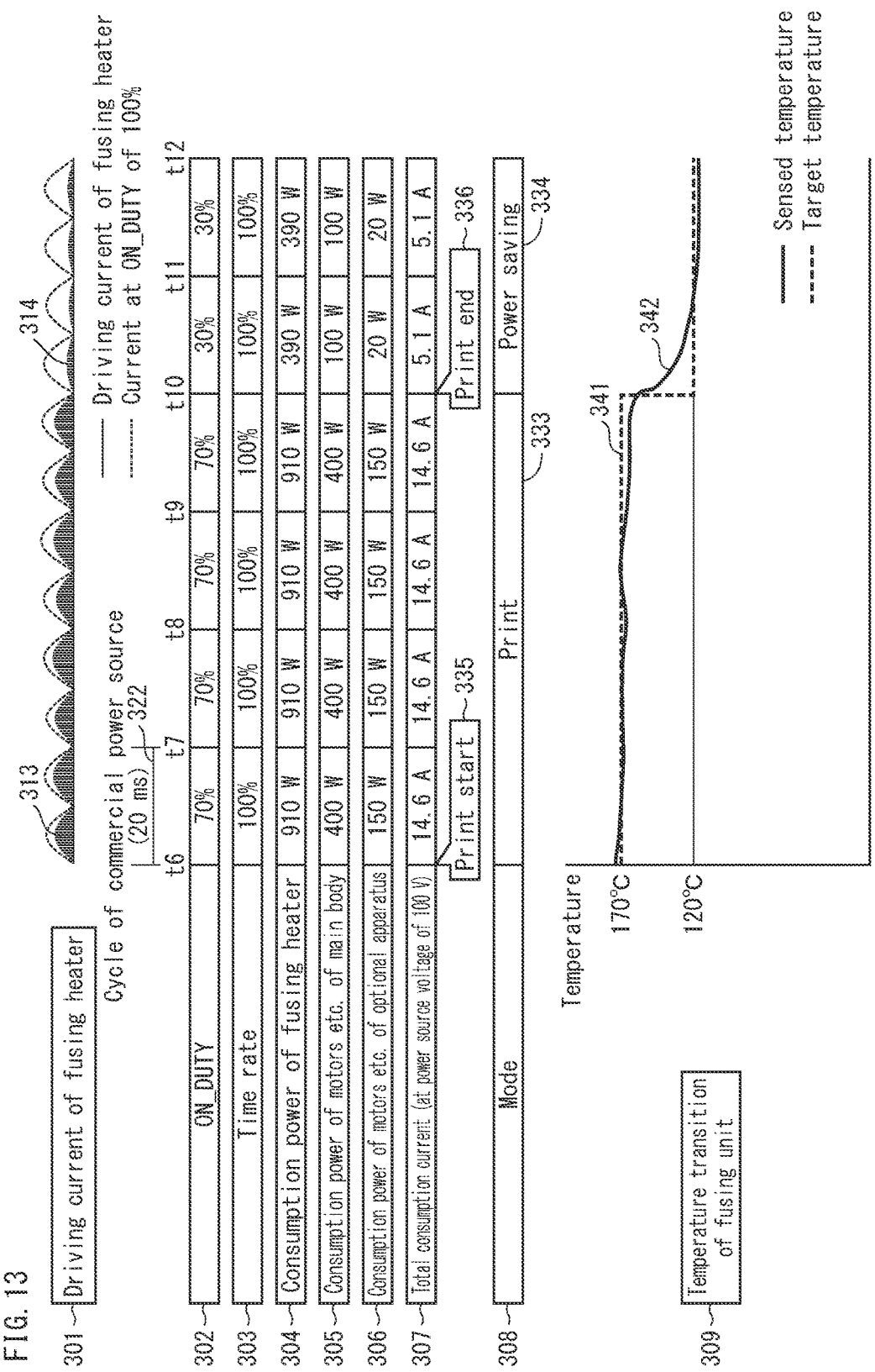
FIG. 13 illustrates the waveform of the driving current flowing through the fusing heater 53 starting immediately after power-on, and so on, continuing from FIG. 12.

1.7 OPERATION EXAMPLES (1) Example 1 of Operations Starting Immediately After Power-On The following describes an example of operations performed in the case where the image forming system 1 enters the warm-up mode after power-on, switches to the print mode, and further switches to the power saving mode, with reference to FIGS. 12 and 13. Note that, in the middle of the warm-up mode, an operation of an optional apparatus is added and thus consumption power of the optional apparatus increases.

In FIGS. 12 and 13, the horizontal axis (temporal axis) represents time proceeding (time t1, t2, t3, t12) continuing from FIG. 12 to FIG. 13. Each interval between time t1 and time t2, between time t2 and time t3, between time t11 and time t12 is equivalent to a cycle 322 of the commercial power source 19. Also, the vertical axis (item axis) represents items including driving current of the fusing heater 53 (301), ON_DUTY of the fusing heater 53 (302), time rate of the fusing heater 53 (303), consumption power of the fusing heater 53 (304), consumption power of the motors and so on of the main body of the image forming apparatus 10 (305), the consumption power of the motors and so on of an optional apparatus (306), the total consumption current of the whole image forming system 1 (307), mode of the image forming system 1 (308), and transition of the surface temperature of the heating roller 51 included in the fusing unit 50 (309). In FIGS. 12 and 13, reference numerals 341 and 342 represent a target temperature and a sensed temperature of the surface of the heating roller 51 included in the fusing unit 50, respectively.

Note that, for the purpose of simplifying presentation in the horizontal axial direction in FIGS. 12 and 13, presentation of the waveform of the driving current and corresponding items in the horizontal axial direction is partially omitted. The same applies to FIGS. 14 and 15 which are described later.

As illustrated in FIG. 12, at time t1, the image forming system 1 is powered on (321). In a time period from time t1 to time t3, a full-wave-rectified driving current 311 flows through the fusing heater 53. In this time period, the ON_DUTY of the fusing heater 53 is 100%, the time rate of the fusing heater 53 is 100%, the consumption power of the fusing heater 53 is 1300 W, the consumption power of the motors and so on of the main body of the image forming apparatus 10 is 200 W, the consumption power of the motors and so on of the optional apparatus is 0 W, the total consumption current of the whole image forming system 1 is 15 A, and the mode of the image forming system 1 is the warm-up mode (332). The surface temperature of the heating roller 51 increases from a low value to approximately 160° C.

At time t3, the optional apparatus starts operating (323). In a time period from time t3 to time t6, a driving current 312 flows through the fusing heater 53 by the second control method. In this time period, the ON_DUTY of the fusing heater 53 is 100%, the time rate of the fusing heater 53 is 93%, the consumption power of the fusing heater 53 is 1200 W, the consumption power of the motors and so on of the main body of the image forming apparatus 10 is 200 W, the consumption power of the motors and so on of the optional apparatus is 100 W, the total consumption current of the whole image forming system 1 is 15 A, and the mode of the image forming system 1 is the warm-up mode (332). The surface temperature of the heating roller 51 increases from approximately 160° C. to approximately 170° C., and then is steady around approximately 170° C.

As illustrated in FIG. 13, at time t6, the image forming system 1 switches from the warm-up mode to the print mode, and a print operation starts (335). In a time period from time t6 to time t10, a driving current 313 flows through the fusing heater 53 by the first control method. In this time period, the ON_DUTY of the fusing heater 53 is 70%, the time rate of the fusing heater 53 is 100%, the consumption power of the fusing heater 53 is 910 W, the consumption power of the motors and so on of the main body of the image forming apparatus 10 is 400 W, the consumption power of the motors and so on of the optional apparatus is 150 W, the total consumption current of the whole image forming system 1 is 14.6 A, and the mode of the image forming system 1 is the print mode (333). The surface temperature of the heating roller 51 is steady around approximately 170° C.

At time t10, the print operation ends (336). In a time period from time t10 to time t12, a driving current 314 flows through the fusing heater 53 by the first control method. In this time period, the ON_DUTY of the fusing heater 53 is 30%, the time rate of the fusing heater 53 is 100%, the consumption power of the fusing heater 53 is 390 W, the consumption power of the motors and so on of the main body of the image forming apparatus 10 is 100 W, the consumption power of the motors and so on of the optional apparatus is 20 W, the total consumption current of the whole image forming system 1 is 5.1 A, and the mode of the image forming system 1 is the power saving mode (334). The surface temperature of the heating roller 51 decreases from approximately 170° C. to approximately 120° C., and then is steady around approximately 120° C.

(2) Example 2 of Operations Starting Immediately After Power-On

Figure 14:
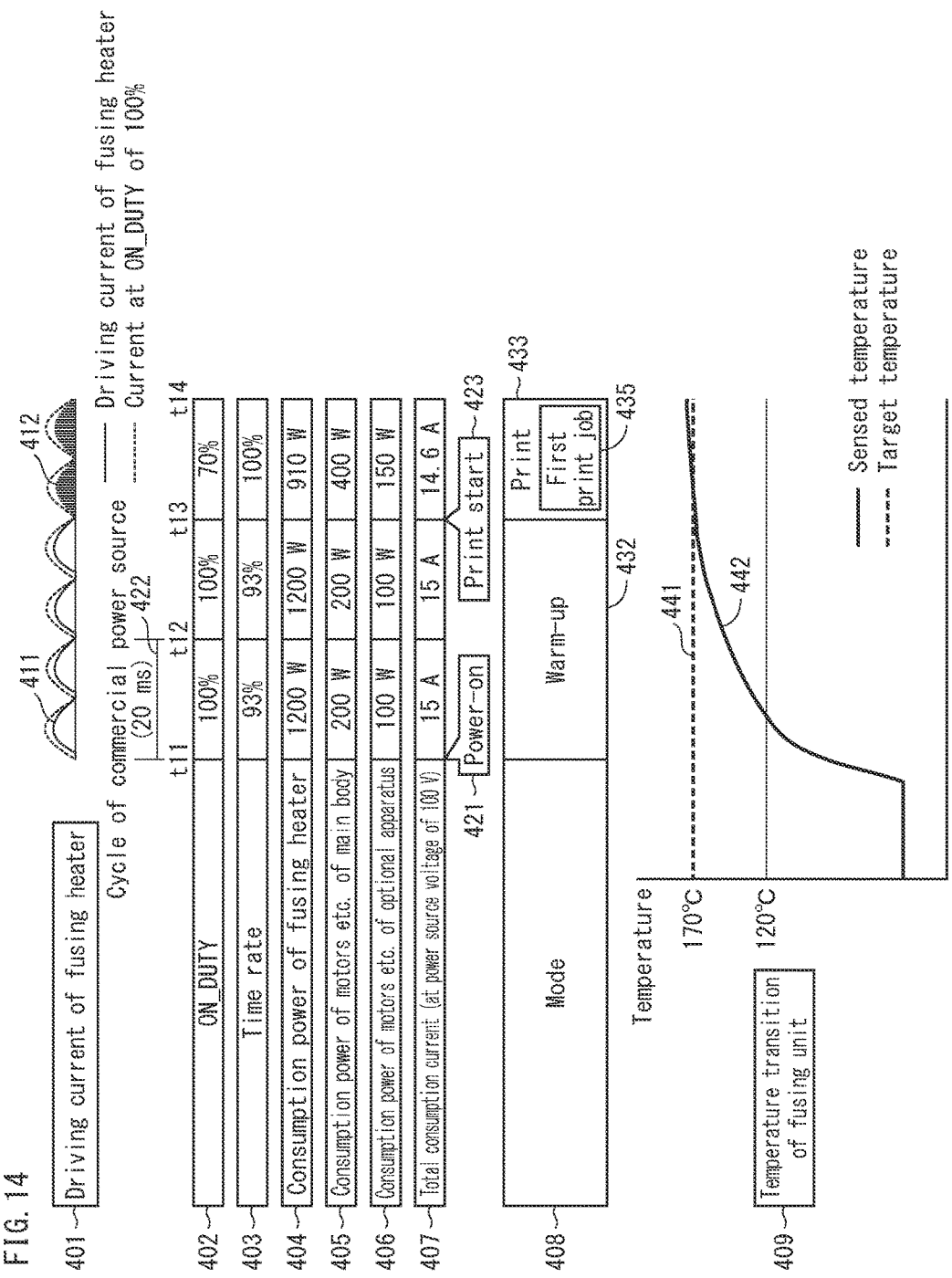
FIG. 14 illustrates a waveform of a driving current flowing through the fusing heater 53 starting immediately after power-on, and so on, continuing to FIG. 15.
Figure 15:
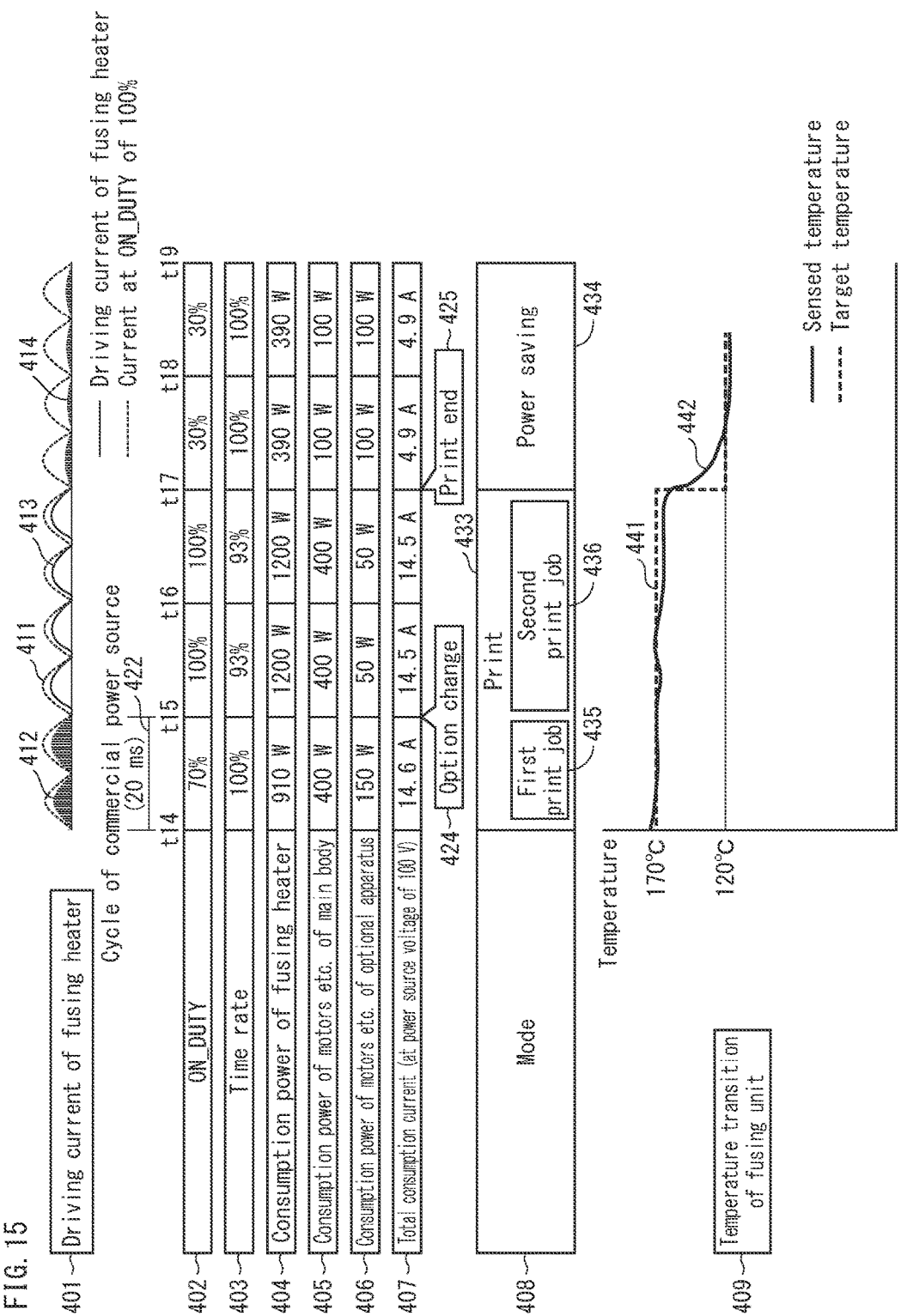
FIG. 15 illustrates the waveform of the driving current flowing through the fusing heater 53 starting immediately after power-on, and so on, continuing from FIG. 14.

The following describes an example of operations performed in the case where the image forming system 1 enters the warm-up mode after power-on, switches to the print mode, and further switches to the power saving mode, with reference to FIGS. 14 and 15. Note that, in the print mode, two print jobs corresponding to different option designations are successively executed. When execution of a first print job ends and execution of a second print job starts, consumption power of the optional apparatus changes.

In FIGS. 14 and 15, the horizontal axis (temporal axis) represents time proceeding (time t11, t12, t13, t19) continuing from FIG. 14 to FIG. 15. Each interval between time t11 and time t12, between time t12 and time t13, . . . , between time t18 and time t19 is equivalent to a cycle 422 of the commercial power source 19. Also, in the same manner as FIGS. 12 and 13, the vertical axis (item axis) represents items including driving current of the fusing heater 53 (401), ON_DUTY of the fusing heater 53 (402), time rate of the fusing heater 53 (403), consumption power of the fusing heater 53 (404), consumption power of the motors and so on of the main body of the image forming apparatus 10 (405), consumption power of the motors and so on of the optional apparatus (406), the total consumption current of the whole image forming system 1 (407), mode of the image forming system 1 (408), and transition of the surface temperature of the heating roller 51 included in the fusing unit 50 (409). In FIGS. 14 and 15, reference numerals 441 and 442 represent a target temperature and a sensed temperature of the surface of the heating roller 51 included in the fusing unit 50, respectively.

As illustrated in FIG. 14, at time t11, the image forming system 1 is powered on (421). In a time period from time t11 to time t13, a driving current 411 flows through the fusing heater 53 by the second control method. In this time period, the ON_DUTY of the fusing heater 53 is 100%, the time rate of the fusing heater 53 is 93%, the consumption power of the fusing heater 53 is 1200 W, the consumption power of the motors and so on of the main body of the image forming apparatus 10 is 200 W, the consumption power of the motors and so on of the optional apparatus is 100 W, the total consumption current of the whole image forming system 1 is 15 A, and the mode of the image forming system 1 is the warm-up mode (432). The surface temperature of the heating roller 51 increases from a low value to approximately 170° C.

At time t13, the image forming system 1 switches from the warm-up mode to the print mode, and execution of a print job 435 starts (423). In a time period from time t13 to time t15, a driving current 412 flows through the fusing heater 53 by the first control method. In this time period, the ON_DUTY of the fusing heater 53 is 70%, the time rate of the fusing heater 53 is 100%, the consumption power of the fusing heater 53 is 910 W, the consumption power of the motors and so on of the image forming apparatus 10 is 400 W, the consumption power of the motors and so on of the optional apparatus is 150 W, the total consumption current of the whole image forming system 1 is 14.6 A, the mode of the image forming system 1 is the print mode (433), and a print job 435 is executed. The surface temperature of the heating roller 51 is steady around approximately 170° C.

As illustrated in FIG. 15, at time t15, execution of a print job 436 starts, the optional apparatus is changed (424), and the print operation continues. In a time period from time t15 to time t17, a driving current 413 flows through the fusing heater 53 by the second control method. In this time period, the ON_DUTY of the fusing heater 53 is 100%, the time rate of the fusing heater 53 is 93%, the consumption power of the fusing heater 53 is 1200 W, the consumption power of the motors and so on of the main body of the image forming apparatus 10 is 400 W, the consumption power of the motors and so on of the optional apparatus is 50 W, the total consumption current of the whole image forming system 1 is 14.5 A, the mode of the image forming system 1 is the print mode (433), and a print job 436 is executed. The surface temperature of the heating roller 51 is steady around approximately 170° C.

At time t17, the print operation ends (425). In a time period from time t17 to time t19, a driving current 414 flows through the fusing heater 53 by the first control method. In this time period, the ON_DUTY of the fusing heater 53 is 30%, the time rate of the fusing heater 53 is 100%, the consumption power of the fusing heater 53 is 390 W, the consumption power of the motors and so on of the main body of the image forming apparatus 10 is 100 W, the consumption power of the motors and so on of the optional apparatus is 100 W, the total consumption current of the whole image forming system 1 is 4.9 A, and the mode of the image forming system 1 is the power saving mode (434). The surface temperature of the heating roller 51 decreases from approximately 170° C. to approximately 120° C., and then is steady around approximately 120° C.

1.8 OPERATIONS OF IMAGE FORMING APPARATUS 10

The following describes the operations of the image forming apparatus 10.

(1) Outline of Operations of Whole Image Forming Apparatus 10

Figure 16:
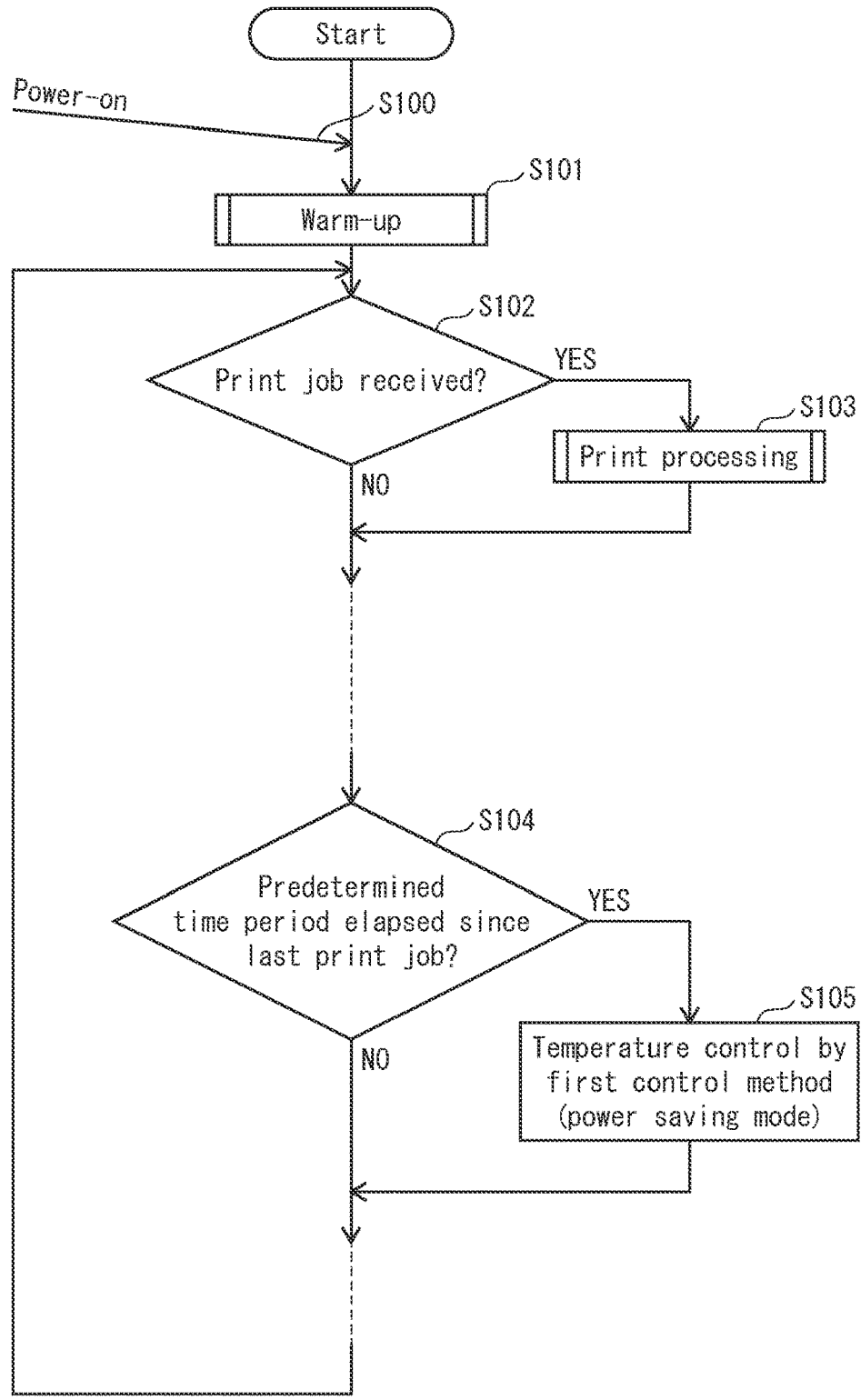
FIG. 16 is a flowchart illustrating outline of operations of the whole image forming apparatus 10.

The outline of the operations of the whole image forming apparatus 10 is described with reference to a flowchart illustrated in FIG. 16.

Upon receiving a power-on operation from the user (Step S100), the main control unit 40 performs control for warm-up operations (Step S101).

Also, upon receiving a print job (Step S102: YES), the main control unit 40 performs control for print processing (Step S103).

Moreover, when a predetermined time period has elapsed since reception of the last print job (Step S104: YES), the main control unit 40 instructs the heater control unit 48 to control the temperature of the fusing heater 53 by the first control method for the power saving mode, and also to switch the image forming apparatus 10 to the power saving mode (Step S105).

Subsequently, the main control unit 40 proceeds to Step S102 to repeat the processing.

(2) Operation in Warm-Up Mode

Figure 17:
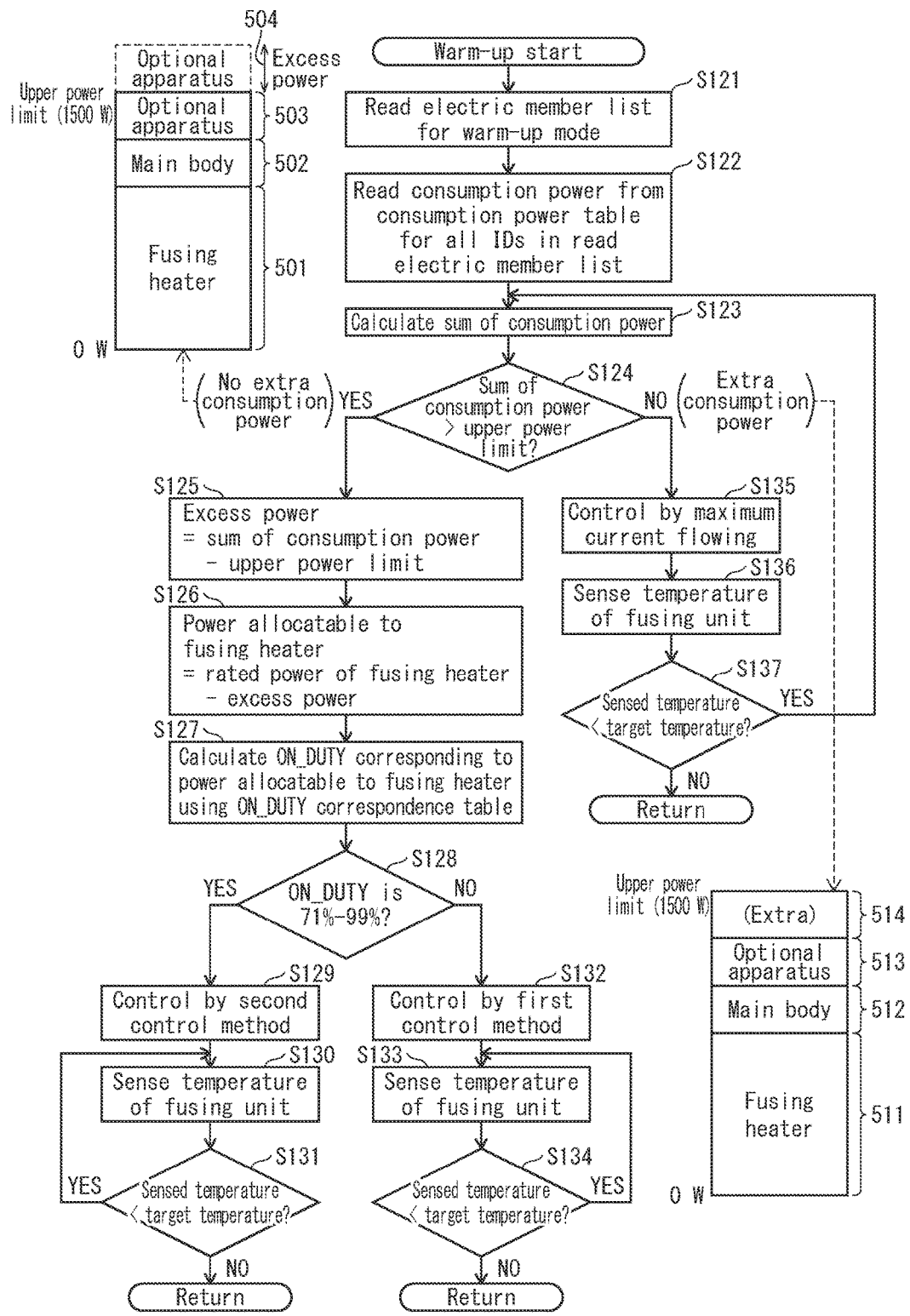
FIG. 17 is a flowchart illustrating operations of the printer control unit 45 in the warm-up mode.

The operations of the printer control unit 45 in the warm-up mode are described with reference to a flowchart illustrated in FIG. 17.

The reading unit 45a of the printer control unit 45 reads an electric member list for the warm-up mode (Step S121). Then, with respect to each of all IDs included in the read electric member list, the reading unit 45a reads a consumption power for the warm-up mode from the consumption power table 201 stored in the storage unit 49 (Step S122). Then, the calculation unit 45b calculates the sum of the read consumption power (Step S123).

The determination unit 45c compares the sum of consumption power with the upper power limit of the image forming system 1 (Step S124). In the case where the sum of consumption power exceeds the upper power limit (Step S124: YES), that is, in the case where no extra consumption power remains and the total power, which is the sum of the power of the fusing heater (501), the power of the main body (502), and the power of the optional apparatus (503 and 504), exceeds the upper power limit (1500 W) as illustrated in an upper left portion of FIG. 17, the calculation unit 45b calculates an excess power (excess power=sum of consumption power−upper power limit) (Step S125). Then, the calculation unit 45b calculates a power allocatable to the fusing heater 53 (allocatable power=rated power of fusing heater 53−excess power) (Step S126). Then, the calculation unit 45b obtains ON_DUTY corresponding to the power allocatable to the fusing heater 53, with use of the ON_DUTY correspondence table 251 (Step S127).

Next, the determination unit 45c determines whether the obtained ON_DUTY falls within or outside a range of 71%-99% (Step S128). In the case where the obtained ON_DUTY falls within the range of 71%-99% (Step S128: YES), the heater control unit 48 controls current supply to the fusing heater 53 by the second control method (Step S129). Next, the heater control unit 48 acquires the surface temperature of the heating roller 51 sensed by the temperature sensor 54 (Step S130). The determination unit 45c compares the sensed temperature with the target temperature (Step S131). In the case where the sensed temperature is lower than the target temperature (Step S131: YES), the printer control unit 45 proceeds to Step S130 to repeat the processing. In the case where the sensed temperature is equal to or higher than the target temperature (Step S131: NO), the printer control unit 45 ends the operation in the warm-up mode.

In the case where the obtained ON_DUTY falls outside the range of 71%-99% (Step S128: NO), the heater control unit 48 controls current supply to the fusing heater 53 by the first control method for the print mode (Step S132). Then, the heater control unit 48 acquires the surface temperature of the heating roller 51 sensed by the temperature sensor 54 (Step S133). The determination unit 45c compares the sensed temperature with the target temperature (Step S134). In the case where the sensed temperature is lower than the target temperature (Step S134: YES), the printer control unit 45 proceeds to Step S133 to repeat the processing. In the case where the sensed temperature is equal to or higher than the target temperature (Step S134: NO), the printer control unit 45 ends the operation in the warm-up mode.

In the case where the sum of consumption power is lower than or equal to the upper power limit (Step S124: NO), that is, in the case where an extra consumption power remains and the total power, which is the sum of the power of the fusing heater (511), the power of the main body (512), and the power of the optional apparatus (513), does not exceed the upper power limit (1500 W) as illustrated in a lower right portion of FIG. 17, the heater control unit 48 controls current supply to the fusing heater 53 by flowing a current at the rated power to the fusing heater 53 (Step S135). Then, the heater control unit 48 acquires the surface temperature of the heating roller 51 sensed by the temperature sensor 54 (Step S136). The determination unit 45c compares the sensed temperature with the target temperature (Step S137). In the case where the sensed temperature is lower than the target temperature (Step S137: YES), the printer control unit 45 proceeds to Step S123 to repeat the processing. In the case where the sensed temperature is equal to or higher than the target temperature (Step S137: NO), the printer control unit 45 ends the operation in the warm-up mode.

(3) Operation in Print Mode

Figure 18:
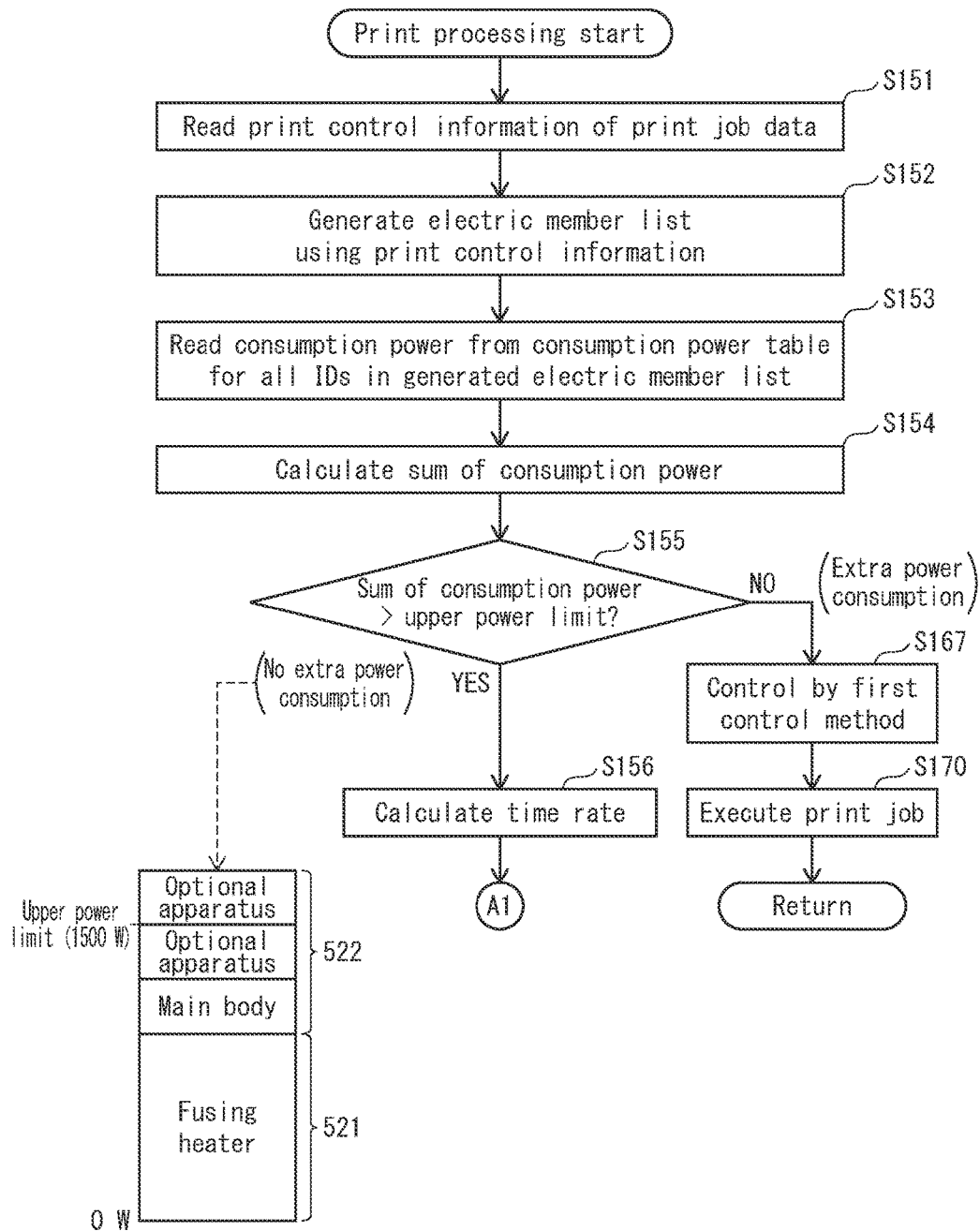
FIG. 18 is a flowchart illustrating operations of the printer control unit 45 for print processing, continuing to FIG. 19.
Figure 19:
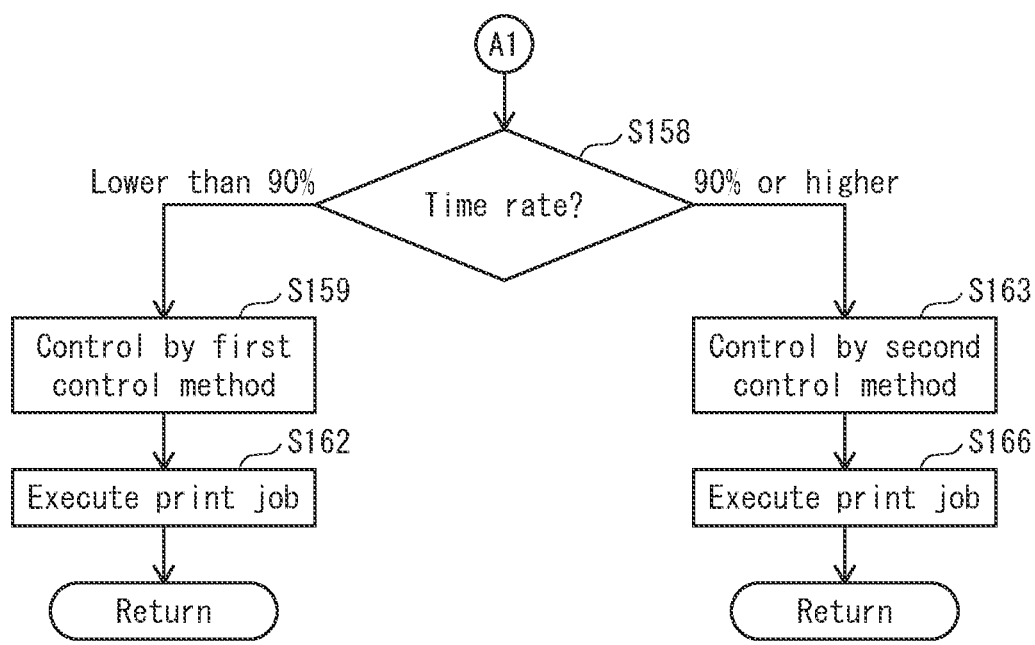
FIG. 19 is a flowchart illustrating the operations of the printer control unit 45 for print processing, continuing from FIG. 18.

The operations of the printer control unit 45 in the print mode are described with reference to flowcharts illustrated in FIGS. 18 and 19.

The reading unit 45a of the printer control unit 45 reads print control information included in print job data pertaining to a print job to be executed (Step S151). Then, the generation unit 45d generates an electric member list with use of the read print control information (Step S152).

Then, with respect to each of all IDs included in the generated electric member list, the reading unit 45a reads a consumption power for the print mode from the consumption power table 201 stored in the storage unit 49 (Step S153). Then, the calculation unit 45b calculates the sum of the read consumption power (Step S154).

The determination unit 45c compares the sum of consumption power with the upper limit for consumption power of the image forming system 1 (Step S155). In the case where the sum of consumption power is higher than the upper power limit (Step S155: YES), that is, in the case where no extra consumption power remains and the total power, which is the sum of the power of the fusing heater (521) and the power of the main body and the optional apparatus (522), exceeds the upper power limit (1500 W) as illustrated in a lower left portion of FIG. 18, the calculation unit 45b calculates a time rate (Step S156).

Then, the determination unit 45c determines whether the calculated time rate is lower than 90% (Step S158).

In the case where the calculated time rate is lower than 90% (Step S158: lower than 90%), the heater control unit 48 control current supply to the fusing heater 53 by the first control method for the print mode (Step S159). Then, the printer control unit 45 controls the printer unit 12, the sheet feeding unit 13 or 14, and the post-processing apparatus 16 to perform the print job (Step S162). When execution of the print job completes, the operation of the print processing by the print control unit 45 completes.

In the case where the calculated time rate is 90% or higher (Step S158: 90% or higher), the heater control unit 48 controls current supply to the fusing heater 53 by the second control method (Step S163). Then, the printer control unit 45 controls the printer unit 12, the sheet feeding unit 13 or 14, and the post-processing apparatus 16 to execute the print job (Step S166). When execution of the print job completes, the operation of the print processing by the print control unit 45 completes.

In the case where the sum of consumption power is lower than or equal to the upper power limit (Step S155: NO), the heater control unit 48 controls current supply to the fusing heater 53 by the first control method for the print mode (Step S167). Then, the printer control unit 45 controls the printer unit 12, the sheet feeding unit 13 or 14, and the post-processing apparatus 16 to execute the print job (Step S170). When execution of the print job completes, the operation of the print processing by the printer control unit 45 completes.

1.9 SUMMARY OF EMBODIMENT

Figure 20:
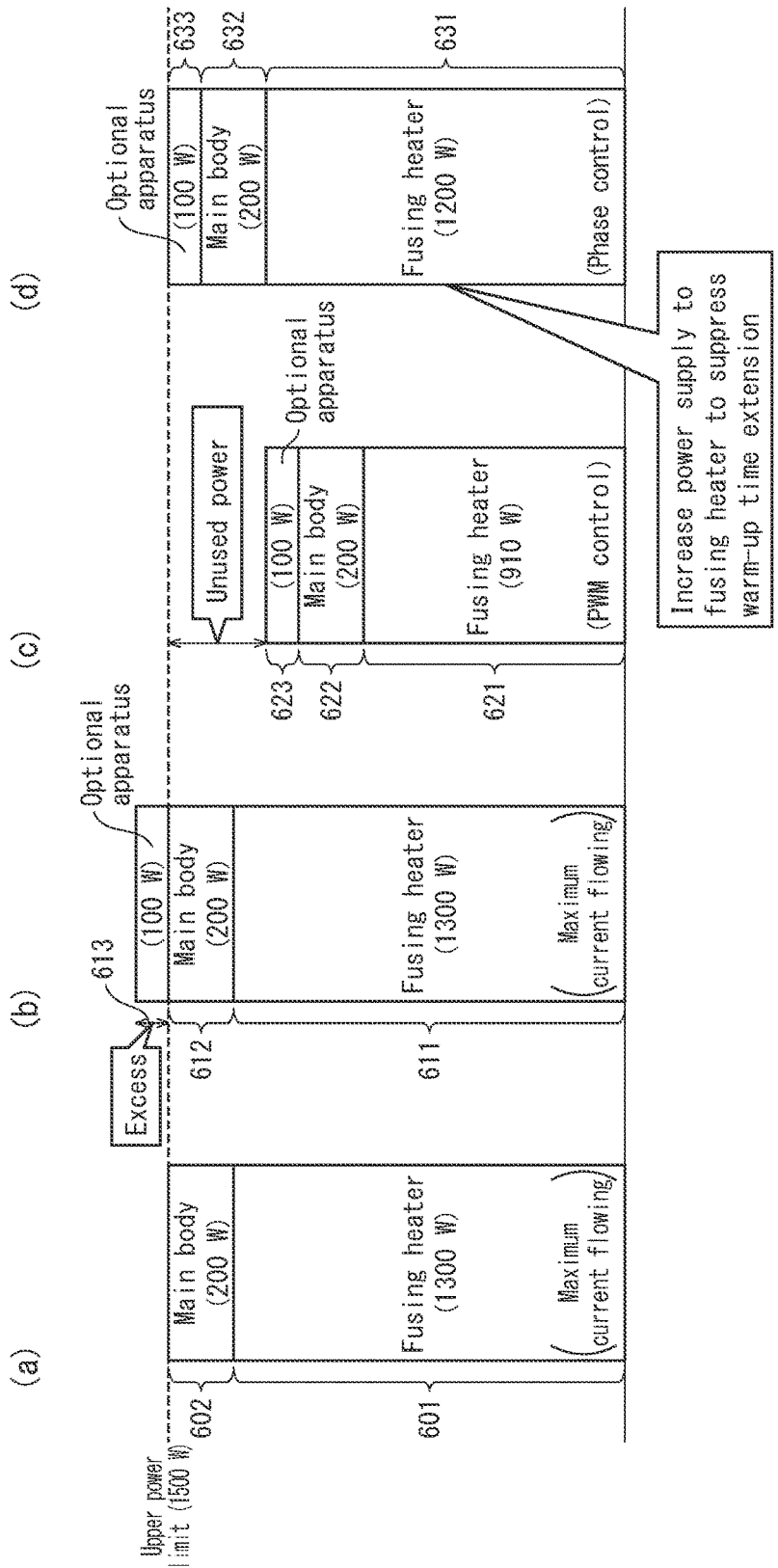
FIG. 20 illustrates an example in portion (a) of power allocation to a main body and the fusing heater 53, an example in portion (b) of power allocation for the case where an optional apparatus operates in addition to the image forming apparatus 10, an example in portion (c) of power allocation under the PWM method, and an example in portion (d) of power allocation under the phase control relating to the present invention.

Assume a case for example as illustrated in portion (c) of FIG. 20 where the fusing heater 53 is supplied with current by the first control method according to which the ON_DUTY is set to 70% or lower in order to avoid noise generation. In this case, the total power, which is the sum of the power of the fusing heater 53, the power of the main body, and the power of the optional apparatus, does not exceed the upper power limit. However, power of 290 W out of the upper power limit of 1500 W (290 W=1500 W−1210 W) is not consumed.

In the present invention compared with this, in the case where an extra consumption power remains, current supply to the fusing heater 53 is controlled by the second control method according to which supply of an alternating current from an alternating-current power source is temporarily interrupted in cycles of the alternating current.

This allows, for example as illustrated in portion (d) of FIG. 20, to increase the power of the fusing heater 53 to 1200 W (631). The total power, which is the sum of 1200 W of the fusing heater 53 (631), 200 W of the main body (632), and 100 W of the optional apparatus (633), equals to the upper power limit of 1500 W.

In this way, it is possible to maximize the power allocatable to the fusing heater 53 so as not to exceed the rated power of the fusing heater 53, thereby suppressing the time increase of warm-up of the fusing unit 50 compared with the case illustrated in portion (c) of FIG. 20.

2 Other Modifications

Although the present invention has been described based on the above embodiment, the present invention is of course not limited to the above embodiment. The present invention also includes the following modifications.

(1) As described in the above embodiment, in the case where an apparatus different from the image forming apparatus 10 such as the post-processing apparatus 16 as an optional apparatus is connected to the image forming system 1, or in the case where the sheet feeding unit 14 as an optional apparatus is included in the image forming system 1, the heater control unit 48 may use only the first control method during image formation without using the second control method.

Compared with the use of the second control method, the use of the first control method reduces variation of the surface temperature of the heating roller 51, and this allows further stabilization of fusing of toner images.

(2) In the above embodiment, the description has been provided on the example where the first control method is switched to the second control method in accordance with the determination result by the determination unit 45c that the calculated time rate is 90% or higher. Alternatively, an image to be formed is text data composed of only characters, signs, and the like or has a printing rate lower than a predetermined value, the heater control unit 48 may control current supply to the fusing heater 53 by the first control method for the print mode.

Such an image to be formed that is text data or has a low printing rate needs a lower heat amount necessary for fusing than an image to be formed that includes a photograph having a high printing rate. Accordingly, it is possible to exhibit a sufficient fusibility by controlling current supply to the fusing heater 53 using the first control method according to which ON_DUTY of 70% or lower is used.

(3) A pulse frequency modulation method may be used as the first control method instead of the PWM method. In other words, the pulse modulation method may be the PWM method or the pulse frequency modulation method.

Also, frequency used in the pulse modulation method is equal to or higher than an upper limit of the audible range.

(4) The above image forming apparatus is a computer system composed of a microprocessor, a ROM, a RAM, and so on. The ROM or the RAM stores thereon a computer program for control. Part of the functions of the image forming apparatus is achieved by the microprocessor operating in accordance with the computer program. Here, the computer program is composed of a plurality of command codes that show instructions to the computer, in order to achieve predetermined functions.

The present invention may be the above methods. Alternatively, the present invention may be a computer program that embodies the methods by a computer.

Further alternatively, the present invention may be a computer-readable recording medium recording the computer program therein, such as a flexible disk, a hard disk, an optical disc, and a semiconductor memory. Yet alternatively, the present invention may be the computer program recorded in the recording medium.

Alternatively, the present invention may be the computer program transmitted via an electric communication line, a wireless or wired communication line, a network typified by the Internet, or the like.

(5) The present invention may be any combination of the above embodiment and modifications.

Although one or more embodiments of the present invention have been described and illustrated in detail, the disclosed embodiments are made for the purposes of illustration and example only and not limitation. The scope of the present invention should be interpreted by the terms of the appended claims

What is claimed is:

1. An image forming apparatus comprising:
a plurality of devices that perform a series of electrostatic copying processes and each have one or more electric elements, wherein one of the devices has a heater as an electric element and fuses a toner image onto a sheet with a fusing member heated by the heater, and another of the devices is a drive circuit that controls supply of an alternating current from an alternating-current power source to the heater by switching between a pulse modulation method and a phase control method, the pulse modulation method using a duty ratio within a predetermined range, the phase control method temporarily interrupting the supply of the alternating current to the heater in half cycles of the alternating current; and
a hardware processor that:
acquires element information indicating two or more electric elements that include the heater among the electric elements of the devices;

acquires, before start of current supply to the electric elements indicated by the element information, rated power information indicating a rated power of the heater and consumption power information indicating a total consumption power of the electric elements indicated by the element information excluding the heater;

calculates a remaining power by subtracting the total consumption power from an upper power limit allocated to the image forming apparatus, and calculates, as a consumption power allocatable to the heater, a maximum power that does not exceed both the rated power indicated by the rated power information and the calculated remaining power;

obtains a duty ratio based on an assumption of current supply corresponding to the calculated maximum power according to pulse modulation, and determines whether the obtained duty ratio falls within or outside the predetermined range; and controls the drive circuit to supply the alternating current by the pulse modulation method when determining that the duty ratio falls within the predetermined range, and controls the drive circuit to supply the alternating current by the phase control method when determining that the duty ratio falls outside the predetermined range.

2. The image forming apparatus of claim 1, wherein
the electric elements of the devices include the minimal electric elements used for performing the electrostatic copying processes and one or more optional electric elements used for performing processing as an addition to the electrostatic copying processes, and
the hardware processor acquires the element information indicating the minimal electric elements and the one or more optional electric elements.

3. The image forming apparatus of claim 1, wherein
the hardware processor acquires the element information in a process of heating the fusing member to a toner particle fusing temperature.

4. The image forming apparatus of claim 1, wherein
the drive circuit includes a chopper circuit having a freewheel diode, and
the predetermined range is a limit range within which a recovery current is not generated in the freewheel diode.

5. The image forming apparatus of claim 1, wherein
the hardware processor controls the drive circuit to use the phase control method in a process of heating the fusing member to a toner particle fusing temperature.

6. The image forming apparatus of claim 1, wherein
when a device having one or more electric elements is newly connected to the image forming apparatus, the hardware processor controls the drive circuit to use only the pulse modulation method during image formation.

7. The image forming apparatus of claim 6, wherein
the newly connected device is a sheet feeding apparatus or a post-processing apparatus.

8. The image forming apparatus of claim 1, wherein
even when determining that the duty ratio falls outside the predetermined range, the hardware processor controls the drive circuit to use the pulse modulation method when an image to be formed is text data or has a printing rate lower than a predetermined value.

9. The image forming apparatus of claim 1, wherein
in image formation after heating of the fusing member to a toner particle fusing temperature, the hardware processor calculates a time rate that is a rate of a time period of current supply to the heater in one cycle of an alternating current, and determines whether the calculated time rate exceeds a predetermined value, and
when determining that the time rate does not exceed the predetermined value, the hardware processor controls the drive circuit to use the pulse modulation method.

10. The image forming apparatus of claim 1, wherein
the pulse modulation method is a pulse width modulation method or a pulse frequency modulation method.

11. The image forming apparatus of claim 1, wherein
frequency used in the pulse modulation method is equal to or higher than an upper limit of an audible range.

12. A non-transitory computer-readable recording medium recording a computer program thereon for use in an image forming apparatus, the image forming apparatus including a plurality of devices that perform a series of electrostatic copying processes and each have one or more electric elements, wherein one of the devices has a heater as an electric element and fuses a toner image onto a sheet with a fusing member heated by the heater, and another of the devices is a drive circuit that controls supply of an alternating current from an alternating-current power source to the heater by switching between a pulse modulation method and a phase control method, the pulse modulation method using a duty ratio within a predetermined range, the phase control method temporarily interrupting the supply of the alternating current to the heater in half cycles of the alternating current, wherein
the computer program causes a hardware processor to perform:
acquiring element information indicating two or more electric elements that include the heater among the electric elements of the devices;
acquiring, before start of current supply to the electric elements indicated by the element information, rated power information indicating a rated power of the heater and consumption power information indicating a total consumption power of the electric elements indicated by the element information excluding the heater;
calculating a remaining power by subtracting the total consumption power from an upper power limit allocated to the image forming apparatus, and calculating, as a consumption power allocatable to the heater, a maximum power that does not exceed both the rated power indicated by the rated power information and the calculated remaining power;
obtaining a duty ratio based on an assumption of current supply corresponding to the calculated maximum power according to pulse modulation, and determining whether the obtained duty ratio falls within or outside the predetermined range; and
controlling the drive circuit to supply the alternating current by the pulse modulation method when determining that the duty ratio falls within the predetermined range, and controlling the drive circuit to supply the alternating current by the phase control method when determining that the duty ratio falls outside the predetermined range.

13. The non-transitory recording medium of claim 12, wherein
the electric elements of the devices include the minimal electric elements used for performing the electrostatic copying processes and one or more optional electric elements used for performing processing as an addition to the electrostatic copying processes, and the computer program causes the hardware processor to acquire the element information indicating the minimal electric elements and the one or more optional electric elements.

14. The non-transitory recording medium of claim 12, wherein
the computer program causes the hardware processor to acquire the element information in a process of heating the fusing member to a toner particle fusing temperature.

15. The non-transitory recording medium of claim 12, wherein
the drive circuit includes a chopper circuit having a freewheel diode, and
the predetermined range is a limit range within which a recovery current is not generated in the freewheel diode.

16. The non-transitory recording medium of claim 12, wherein
the computer program causes the hardware processor to control the drive circuit to use the phase control method in a process of heating the fusing member to a toner particle fusing temperature.

17. The non-transitory recording medium of claim 12, wherein
when a device having one or more electric elements is newly connected to the image forming apparatus, the computer program causes the hardware processor to control the drive circuit to use only the pulse modulation method during image formation.

18. The non-transitory recording medium of claim 17, wherein
the newly connected device is a sheet feeding apparatus or a post-processing apparatus.

19. The non-transitory recording medium of claim 12, wherein
even when determining that the duty ratio falls outside the predetermined range, the computer program causes the hardware processor to control the drive circuit to use the pulse modulation method when an image to be formed is text data or has a printing rate lower than a predetermined value.

20. The non-transitory recording medium of claim 12, wherein
in image formation after heating of the fusing member to a toner particle fusing temperature, the computer program causes the hardware processor to calculate a time rate that is a rate of a time period of current supply to the heater in one cycle of an alternating current, and determine whether the calculated time rate exceeds a predetermined value, and
when determining that the time rate does not exceed the predetermined value, the computer program causes the hardware processor to controls the drive circuit to use the pulse modulation method.

* * * * *